United States Patent
Minagawa et al.

(10) Patent No.: US 9,407,791 B2
(45) Date of Patent: Aug. 2, 2016

(54) INFORMATION PROCESSING APPARATUS AND COMPUTER-READABLE STORAGE MEDIUM STORING PROGRAM FOR INTERPOLATING AN INPUT COLOR

(71) Applicant: FUJITSU LIMITED, Kawasaki-shi, Kanagawa (JP)

(72) Inventors: Akihiro Minagawa, Tachikawa (JP); Yasumasa Iwamura, Akashi (JP); Hiroyuki Kobayashi, Kawasaki (JP); Satoru Ushijima, Kawasaki (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/601,447

(22) Filed: Jan. 21, 2015

(65) Prior Publication Data

US 2015/0221100 A1    Aug. 6, 2015

(30) Foreign Application Priority Data

Feb. 6, 2014 (JP) ................. 2014-020948

(51) Int. Cl.
*H04N 1/60* (2006.01)

(52) U.S. Cl.
CPC ............. *H04N 1/60* (2013.01); *H04N 1/6019* (2013.01)

(58) Field of Classification Search
None
See application file for complete search history.

(56) References Cited

U.S. PATENT DOCUMENTS

| | | | | |
|---|---|---|---|---|
| 5,504,821 A * | 4/1996 | Kanamori | ............... | G06F 17/17 348/650 |
| 6,571,010 B1 * | 5/2003 | Inoue | ............... | H04N 1/6019 382/162 |
| 6,798,411 B1 * | 9/2004 | Gorman | ............... | G06T 17/20 345/420 |
| 7,812,993 B2 * | 10/2010 | Bright | ............... | G06T 9/001 358/1.15 |
| 7,990,591 B2 * | 8/2011 | Koyama | ............... | G06T 11/001 358/1.9 |
| 2005/0083329 A1 * | 4/2005 | Gorman | ............... | G06T 17/20 345/423 |

FOREIGN PATENT DOCUMENTS

| | | |
|---|---|---|
| EP | 0404398 | 5/1995 |
| JP | 02-23776 | 1/1990 |
| JP | 03-37696 | 2/1991 |
| JP | 2000-48179 | 2/2000 |
| JP | 2002-10095 | 1/2002 |
| JP | 2003-125224 | 4/2003 |
| JP | 2004-179819 | 6/2004 |
| JP | 2009-165030 | 7/2009 |
| JP | 2010-45560 | 2/2010 |
| JP | 2012-186832 | 9/2012 |
| WO | 2013/145295 | 10/2013 |

* cited by examiner

*Primary Examiner* — Bernard Krasnic
(74) *Attorney, Agent, or Firm* — Fujitsu Patent Center

(57) ABSTRACT

An information processing apparatus includes: a storage unit that stores a table including information on regions respectively occupied by a plurality of solids whose vertices are defined by a plurality of reference colors that are set in a color space, each of the solids having an evaluation value less than a setting value, the evaluation value decreasing as the length of edges thereof decreases, the solids being arranged such that faces thereof do not cross each other; and a computing unit that specifies a solid containing an input color with use of the table, and performs interpolation processing of the input color with use of the reference colors corresponding to the vertices of the specified solid.

7 Claims, 30 Drawing Sheets

SOLID NUMBER LIST: CORRESPONDENCE
BETWEEN COORDINATES AND SOLID

| R | G | B | SOLID NO. |
|---|---|---|---|
| 60 | 50 | ... | 1 |
| 60 | 50 | ... | 3 |
| 60 | 70 | ... | 2 |
| 60 | 70 | ... | 3 |
| ⋮ | ⋮ | ⋮ | ⋮ |

TWO SOLIDS CONTAIN SAME COORDINATES (rows 1–2)

TWO SOLIDS CONTAIN SAME COORDINATES (rows 3–4)

FIG. 6

COORDINATE LIST: COORDINATES OF VERTEX

| VERTEX NO. | R | G | B |
|---|---|---|---|
| 1 | 50 | 50 | ... |
| 2 | 150 | 50 | ... |
| 3 | 200 | 80 | ... |
| 4 | 100 | 100 | ... |
| 5 | 150 | 150 | ... |
| 6 | 100 | 160 | ... |
| 7 | 50 | 200 | ... |
| ⋮ | ⋮ | ⋮ | ⋮ |

FIG. 7

VERTEX LIST: CORRESPONDENCE BETWEEN SOLID AND VERTICES

| SOLID NO. | VERTEX 1 | VERTEX 2 | VERTEX 3 | VERTEX 4 |
|---|---|---|---|---|
| 1 | 1 | 2 | 4 | ... |
| 2 | 1 | 4 | 7 | ... |
| 3 | 1 | 3 | 6 | ... |
| ⋮ | ⋮ | ⋮ | ⋮ | ⋮ |

FIG. 8

(REMOVE OVERLAPPING SOLIDS: $s_{min}$=1)   SOLID NUMBER LIST

| | R | G | B | SOLID NO. | |
|---|---|---|---|---|---|
| | 60 | 50 | ... | 1 | ⎫ OVERLAP |
| REMOVE | ~~60~~ | ~~50~~ | | ~~3~~ | ⎭ |
| | 60 | 70 | ... | 2 | ⎫ OVERLAP |
| REMOVE | ~~60~~ | ~~70~~ | | ~~3~~ | ⎭ |
| | ⋮ | ⋮ | ⋮ | ⋮ | |

⇓

(REMOVE SOLID $s_{min}$)   SOLID NUMBER LIST

| | R | G | B | SOLID NO. | |
|---|---|---|---|---|---|
| REMOVE | ~~60~~ | ~~50~~ | | ~~1~~ | ⎫ OVERLAP |
| REMOVE | ~~60~~ | ~~50~~ | | ~~3~~ | ⎭ |
| | 60 | 70 | ... | 2 | ⎫ OVERLAP |
| REMOVE | ~~60~~ | ~~70~~ | | ~~3~~ | ⎭ |
| | ⋮ | ⋮ | ⋮ | ⋮ | |

FIG. 9

INFORMATION PROCESSING APPARATUS AND COMPUTER-READABLE STORAGE MEDIUM STORING PROGRAM FOR INTERPOLATING AN INPUT COLOR

CROSS-REFERENCE TO RELATED APPLICATION

This application is based upon and claims the benefit of priority of the prior Japanese Patent Application No. 2014-020948, filed on Feb. 6, 2014, the entire contents of which are incorporated herein by reference.

FIELD

The embodiments discussed herein are related to an information processing apparatus and a computer-readable storage medium storing program.

BACKGROUND

When the colors of a captured image are different from the original colors, processing is performed that converts the color of each pixel of the image into the original color. This processing is called color correction. As a method for implementing color correction, there is, for example, a method which captures an image of an imaging object together with a sample containing a known color (hereinafter "reference color"), and converts the color of each pixel into the original color based on a change in the reference color.

However, the pixels of an image may represent a huge number of colors. Therefore, it is difficult to set all the colors that may be represented by the pixels as reference colors, and to provide conversion to the original color for each of the reference colors in advance. Accordingly, in the case of applying the method described above, interpolation processing is performed so as to obtain the color (hereinafter "input color") of each pixel from a preset reference color. Thus, conversion for the input color is obtained from conversion for the reference color. Then, color correction is performed based on the obtained conversion for the input color.

For example, there is a method that obtains conversion for an input color using volume interpolation. This method sets solids whose vertices are defined by reference colors in a color space, and obtains conversion of an input color using conversion of the reference colors on the vertices of the solid containing the input color. According to this method, the accuracy of color correction increases as the distance between the input color and each reference color used for interpolation processing decreases. In view of the above, as a method for improving the accuracy of color correction, there has been proposed a method that captures an image of a large number of reference colors so as to set a large number of solids in the color space.

There has also been proposed a method that arranges reference colors in a matrix form in a three-dimensional color space, and performs color correction using the reference colors. According to this method, the reference points located on the vertices of each of cubes of the matrix are used for interpolation processing. There has also been proposed a method that specifies a tetrahedron containing an input color, prints a chart for a detailed measurement of the inside of the specified tetrahedron, and corrects the input color based on the results of the color measurement of the printed chart. There has also been proposed a method that determines conversion of an input color based on a reference point located near the input color, without using volume interpolation. There has also been proposed a method that detects the position of a reference color from a captured image containing the reference color, and extracts the color of the reference color from the image.

Examples of the related art are disclosed in:
Japanese Laid-open Patent Publication No. 2000-048179;
Japanese Laid-open Patent Publication No. 02-023776;
Japanese Laid-open Patent Publication No. 2010-045560;
Japanese Laid-open Patent Publication No. 2003-125224; and
International Publication Pamphlet No. WO2013/145295.

In the case of the method that arranges reference colors in a matrix form in a color space, it is possible to uniquely identify a cube containing an input color from the coordinates of the input color in the color space. On the other hand, in the case where reference colors are not arranged in a matrix form, there is freedom in choosing a solid whose vertices are defined by reference colors. In this case, solids to be used for interpolation processing are set in advance, and color correction is performed using the reference colors on the vertices of the solid containing the input color.

The accuracy of color correction depends on the choice of a solid. Further, selecting appropriate vertices (reference colors) for a solid containing the input color imposes a heavy processing load. For example, consider a tetrahedron containing an input color. In this case, if there are N reference colors, then the number of combination of reference colors is of the order of $N^4$. Finding an appropriate combination for interpolation processing from such a large number of combinations imposes a heavy processing load. Accordingly, it takes a long time to perform interpolation processing for all the input colors contained in an image.

SUMMARY

According to one embodiment of the present invention, there is provided an information processing apparatus including: a memory configured to store a table including information on regions respectively occupied by a plurality of solids whose vertices are defined by a plurality of reference colors that are set in a color space, each of the solids having an evaluation value less than a setting value, the evaluation value decreasing as a length of edges thereof decreases, the solids being arranged such that faces thereof do not cross each other; and a processor configured to perform a procedure including: specifying a solid containing an input color with use of the table, and performing interpolation processing of the input color with use of the reference colors corresponding to the vertices of the specified solid.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a solid number list according to the second embodiment;

FIG. 7 illustrates an example of a coordinate list according to the second embodiment;

FIG. 8 illustrates an example of a vertex list according to the second embodiment;

FIG. 9 illustrates a solid removal process according to the second embodiment;

DESCRIPTION OF EMBODIMENTS

Figure 1:
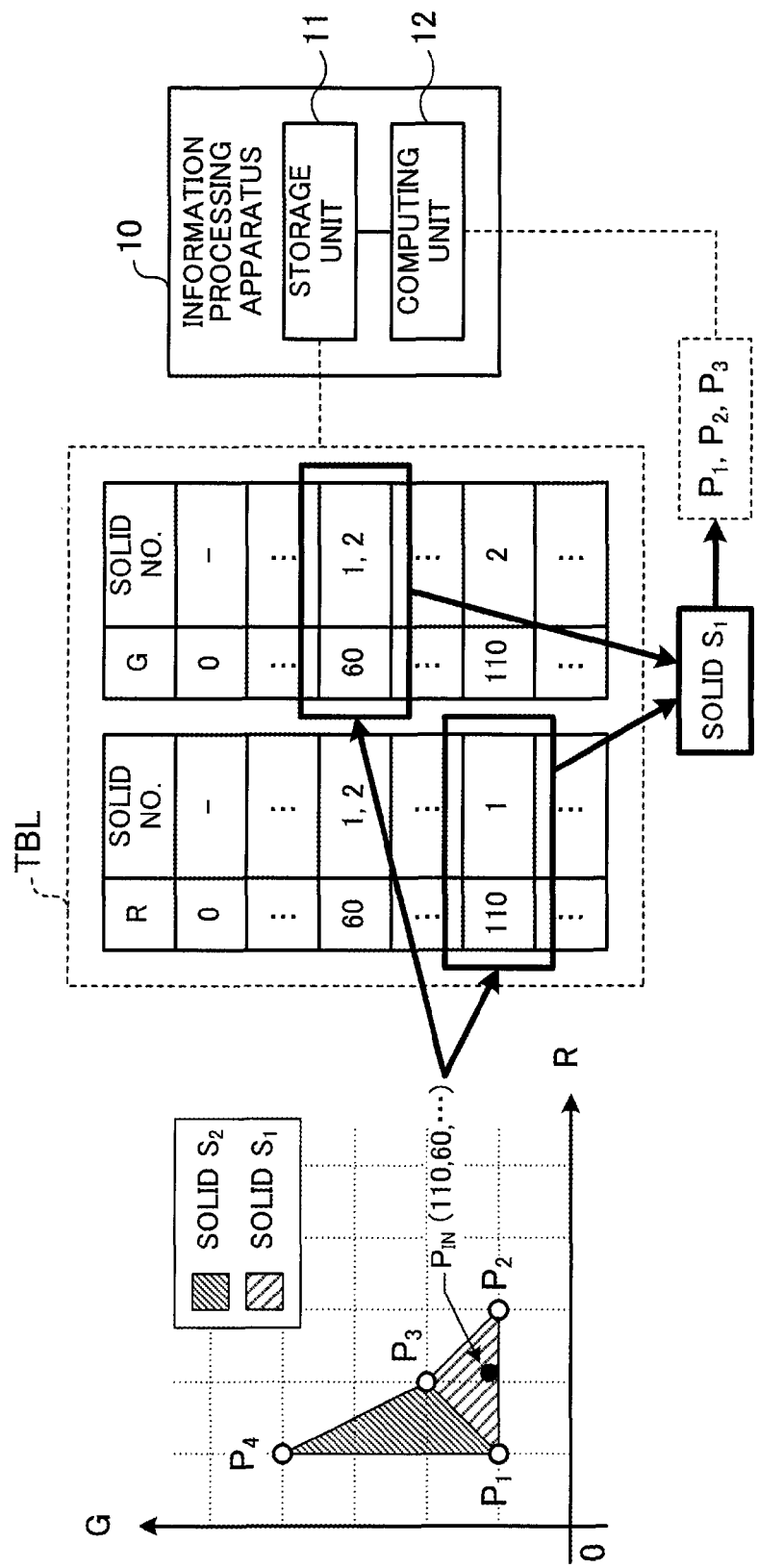
FIG. 1 illustrates an example of an information processing apparatus according to a first embodiment.

Hereinafter, embodiments will be described with reference to the accompanying drawings. Like reference numerals refer to like elements throughout, and a description of like elements will not be repeated.

(1) First Embodiment

A first embodiment will be described with reference to FIG. 1. FIG. 1 illustrates an example of an information processing apparatus according to the first embodiment. An information processing apparatus 10 illustrated in FIG. 1 is an example of an information processing apparatus according to the first embodiment.

As illustrated in FIG. 1, the information processing apparatus 10 includes a storage unit 11 and a computing unit 12.

The storage unit 11 is a volatile storage device such as a random access memory (RAM) and the like, or may be a non-volatile storage device such as an HDD, a flash memory, and the like. The computing unit 12 is a processor such as a central processing unit (CPU), a digital signal processor (DSP), and the like. Alternatively, the computing unit 12 may be an electronic circuit such as an application specific integrated circuit (ASIC), a field programmable gate array (FPGA), and the like. The computing unit 12 executes programs stored in the storage unit 11 or other memories, for example.

The storage unit 11 stores a table TBL. The table TBL includes information on regions respectively occupied by a plurality of solids $S_1$, and $S_2$. The solid $S_1$ contains, on its vertices, reference colors $P_1$, $P_2$, and $P_3$ that are set in a color space. The solid $S_2$ contains, on its vertices, reference colors $P_1$, $P_3$, and $P_4$ that are set in the color space. Each of the solids $S_1$ and $S_2$ has an evaluation value greater than a setting value. Note that the shorter the edges thereof are, the greater the evaluation value is. The solids $S_1$ and $S_2$ are arranged so as not to overlap each other.

In the example of FIG. 1, four reference colors $P_1$, $P_2$, $P_3$, and $P_4$ are set in the color space. Note that the description here is based on a three-dimensional color space defined by an R (red) axis, a G (green) axis, and a B (blue) axis. However, for illustration purposes, the B axis and one vertex of each of the solids $S_1$, and $S_2$ are omitted in FIG. 1.

In two tables included in the table TBL, the value in an "R" field represents the coordinate value on the R axis (hereinafter "R coordinate value"), and the value in a "G" field represents the coordinate value on the G axis (hereinafter "G coordinate value"). That is, the table TBL illustrated in FIG. 1 includes a map that associates an R coordinate value with a solid number identifying a solid (the solid number of the solid $S_1$ is 1, and the solid number of the solid $S_2$ is 2), and a map that associates a G coordinate value with a solid number identifying a solid. These two maps are an example of region information. The number of maps included in the table TBL is less than the number of dimensions of the color space, for example.

The evaluation value mentioned above may be, for example, the total length of all the edges of a solid, the average length of the edges, or the like. Alternatively, the evaluation value may be the length of each edge of a solid. In this case, the table TBL may include information on a solid if the evaluation values of the edges of the solid are greater than a setting value. Further, the setting value mentioned above may be, for example, a value set by the user in advance, a value determined from an evaluation based on experiments so as to achieve color correction of a desired level of accuracy, or the like.

The computing unit 12 specifies the solid $S_1$ containing an input color $P_{IN}$ by referring to the table TBL. Further, the computing unit 12 performs interpolation processing of the input color $P_{IN}$, using the reference colors $P_1$, $P_2$, and $P_3$ corresponding to the vertices of the specified solid $S_1$.

For example, consider the case where the coordinates of $P_1$ are (50, 50, ... ); the coordinates of $P_2$ are (150, 50, ... ); the coordinates of $P_3$ are (100, 100, ... ); the coordinates of $P_4$ are (50, 200, ... ); and the coordinates of $P_{IN}$ are (110, 60, ... ). Note that since the B axis is omitted in FIG. 1, the coordinate value on the B axis is indicated by " ... ".

In this case, the computing unit 12 refers to the table TBL, and extracts a set of solid numbers {1} corresponding to the R coordinate value (110) of the $P_{IN}$, and a set of solid numbers {1, 2} corresponding to the G coordinate value (60) of the $P_{IN}$. Further, the computing unit 12 calculates a product set of the extracted sets of solid numbers ({1}^{1, 2}={1}). Further, the computing unit 12 obtains, as a solid containing the input color $P_{IN}$, a solid ($S_1$ in this example) indicated by the calculated product set. Then, the computing unit 12 performs interpolation processing, using the reference colors $P_1$, $P_2$, and $P_3$ corresponding to the vertices of the solid $S_1$.

As described above, by using a solid that is set in accordance with an evaluation value based on the length of its edges, it is possible to perform high-accuracy color correction based on interpolation processing. Further, since information on solids appropriate for interpolation processing is stored as the table TBL, it is possible to easily specify a solid containing the input color, and thus to perform interpolation processing at high speed.

The above is a description of the first embodiment.

(2) Second Embodiment

Next, a second embodiment will be described. The second embodiment relates to a method that generates a map for determining a combination of reference points (solid) to be used for color correction, and performs color correction of an input color at high speed using the map. Hereinafter, a description will be given of the hardware, functions, and operations of an image processing apparatus capable of implementing this method.

(2-1) Hardware

Figure 2:
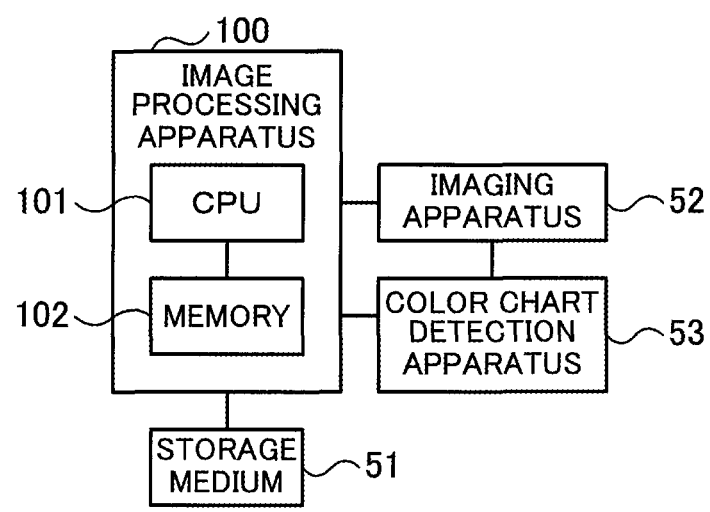
FIG. 2 illustrates an example of the hardware of an image processing apparatus according to a second embodiment.

The hardware of an image processing apparatus 100 will be described with reference to FIG. 2. The image processing apparatus 100 illustrated in FIG. 2 is an example of an image forming apparatus according to the second embodiment. Note that FIG. 2 illustrates an example of the hardware of an image processing apparatus according to the second embodiment;

As illustrated in FIG. 2, the image processing apparatus 100 includes a CPU 101 and a memory 102. The CPU 101 may be a processor such as a DSP and the like, or may be an electronic circuit such as an ASIC, an FPGA, and the like. The memory 102 is a volatile storage device such as a RAM and the like, or a non-volatile storage device such as an HDD, a flash memory, and the like. The CPU 101 executes programs stored in the memory 102 or a storage medium 51 (described below), for example.

The storage medium 51, an imaging apparatus 52, and a color chart detection apparatus 53 are connected to the image processing apparatus 100, for example. The storage medium 51 may be, for example, a portable storage medium such as a magnetic storage device, an optical storage medium, a magneto-optical storage medium, a semiconductor memory, and the like. Programs and data stored in the storage medium 51 are read by the CPU 101.

The imaging apparatus 52 may be, for example, a digital camera or an information terminal having a camera function. An image captured by the imaging apparatus 52 (hereinafter "input image") is input to the image processing apparatus 100, and is stored in the memory 102 via the CPU 101. In this example, for purposes of explanation, an input image from the imaging apparatus 52 is stored in the memory 102. However, for example, a modification is possible in which the CPU 101 reads an input image from an external storage apparatus, and stores the input image in the memory 102.

The color chart detection apparatus 53 is an apparatus that extracts the positions of reference colors from an input image including a color chart in which the reference colors are disposed, and detects information on the reference colors from the input image. The functions of the color chart detection apparatus 53 may be implemented by, for example, an information processing apparatus such as a personal computer and an information terminal. The information on the reference colors extracted from the input image is stored in the memory 102 via the CPU 101. In the case where the position of a color chart disposed in an input image is fixed in advance, the color chart detection apparatus 53 may be omitted.

The functions of the image processing apparatus 100 may be implemented by one or more computers. For example, the functions of the image processing apparatus 100 may be implemented by a system in which computers such as personal computers and server apparatuses and computers such as mobile phones and smart phones are combined. Further, at least one of the imaging apparatus 52 and the color chart detection apparatus 53 may be integrated with the image processing apparatus 100. The following discussion is based on the image processing apparatus 100 illustrated in FIG. 2.

The above is a description of the hardware of the image processing apparatus 100.

(2-2) Functions of Image Processing Apparatus

Figure 3:
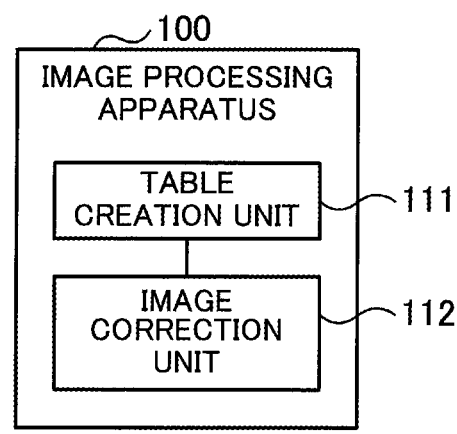
FIG. 3 is a block diagram illustrating an example of functions of the image processing apparatus according to the second embodiment.

The following describes the functions of the image processing apparatus 100 with reference to FIG. 3. FIG. 3 is a block diagram illustrating an example of functions of the image processing apparatus 100 according to the second embodiment.

As illustrated in FIG. 3, the image processing apparatus 100 includes a table creation unit 111 and an image correction unit 112. The functions of the table creation unit 111 and the image correction unit 112 are implemented by the CPU 101 and the memory 102 described above.

The table creation unit 111 creates a table including a plurality of maps used for interpolation processing of input colors from a set of reference colors that are set in the color space. The table includes information indicating a combination of reference colors appropriate for interpolation processing for an arbitrary input color. A combination of reference colors in the color space is represented by a solid whose vertices are defined by reference colors. In the following description, for purposes of explanation, a triangular pyramid (a type of convex hull) whose vertices are defined by four reference colors is assumed as the shape of the solid.

The image correction unit 112 specifies a triangular pyramid containing the input color by referring to the maps that are included in the table created by the table creation unit 111, and performs color correction of the input color based on the four reference colors corresponding to the vertices of the specified triangular pyramid. In this step, the image correction unit 112 performs interpolation processing so as to replace information on conversion for the reference colors with information on conversion for the input color, and convert the input color into the original color based on the information on conversion for the input color. The information on conversion for the reference colors is information that gives a conversion equation between each reference color extracted from an image of a color chart and a color that is set in advance with respect to the reference color.

The table creation unit 111 and the image correction unit 112 will be further described below.

(2-2-1) Table Creation Unit

First, the table creation unit 111 will be described.

(Functional Blocks)

The functions of the table creation unit 111 will be further described with reference to FIG. 4. In the following description, FIGS. 5 through 10 will be referred to as needed.

Figure 4:
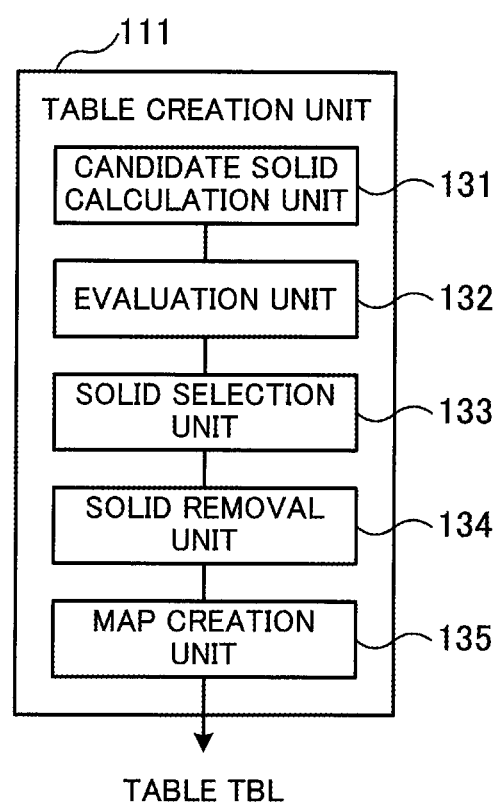
FIG. 4 is a block diagram illustrating an example of functions of a table creation unit according to the second embodiment.
Figure 5:
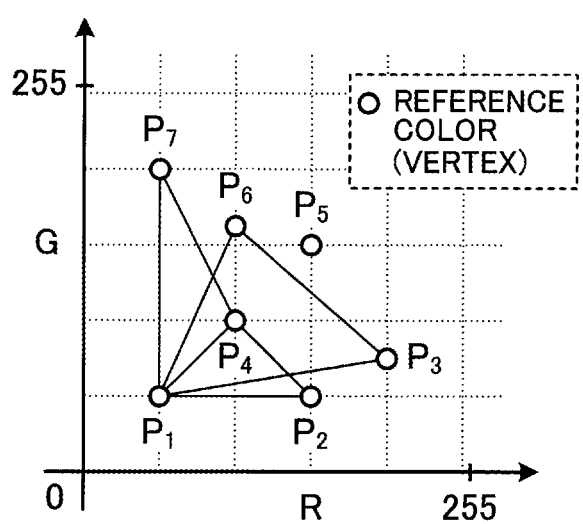
FIG. 5 illustrates an example of the settings of reference colors according to the second embodiment.

FIG. 4 is a block diagram illustrating an example of functions of the table creation unit 111 according to the second embodiment. FIG. 5 illustrates an example of the settings of reference colors according to the second embodiment. FIG. 6 illustrates an example of a solid number list according to the second embodiment.

Figure 10:
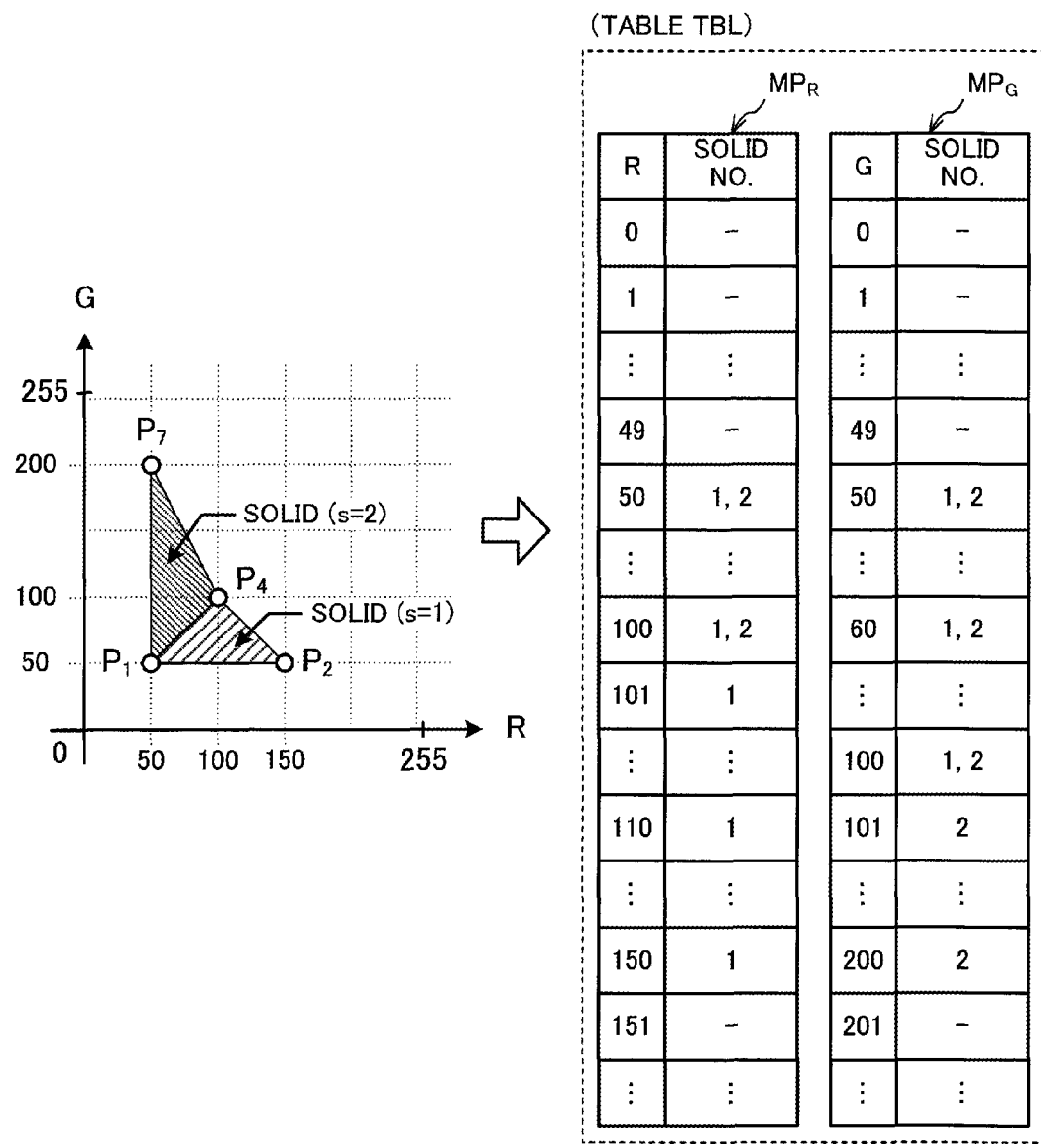
FIG. 10 illustrates a map creation process according to the second embodiment.

FIG. 7 illustrates an example of a coordinate list according to the second embodiment. FIG. 8 illustrates an example of a vertex list according to the second embodiment. FIG. 9 illustrates a solid removal process according to the second embodiment. FIG. 10 illustrates a map creation process according to the second embodiment.

As illustrated in FIG. 4, the table creation unit 111 includes a candidate solid calculation unit 131, an evaluation unit 132, a solid selection unit 133, a solid removal unit 134, and a map creation unit 135.

The candidate solid calculation unit 131 extracts, for each of all the sets of coordinates contained in the color space, solids containing the set of coordinates, and specifies the extracted solids as candidate solids. The color space is set such that, for example, the R coordinate value is in a range from 0 to 255; the G coordinate value is in a range from 0 to 255, and the B coordinate value is in a range from 0 to 255. The evaluation unit 132 gives, for each of the candidate solids specified by the candidate solid calculation unit 131, an evaluation value based on the edges of the candidate solid.

The solid selection unit 133 selects solids to be stored in a map, based on the evaluation values given to the candidate solids by the evaluation unit 132. The solid removal unit 134 removes candidate solids overlapping the solids selected by the solid selection unit 133. The solid selection unit 133 and the solid removal unit 134 repeat selection of solids and removal of solids while retaining (not removing) the already selected solids, until the color space is filled with the solids selected by the solid selection unit 133. After the color space is filled up, the map creation unit 135 creates a look-up table (map) that associates each set of coordinates of the color space and the solid containing the set of coordinates and selected by the solid selection unit 133.

The functions of the table creation unit 111 will now be further described with reference to an example of a color space and reference colors illustrated in FIG. 5.

Note that the following description is based on a three-dimensional color space defined by an R axis, a G axis, and a B axis. However, for illustration purposes, the B (blue) axis is omitted in the color space illustrated in FIG. 5. Further, the solid in the color space is represented by a triangle whose vertices are defined by three reference colors. Due to these constraints on representation, the B coordinate value may be omitted and indicated by " . . . " in the following description. Further, N reference colors are disposed in the color space.

In the example of FIG. 5, seven reference colors $P_1, \ldots,$ and $P_7$ are illustrated. Further, a solid whose vertices are defined by $P_1, P_2,$ and $P_4,$ a solid whose vertices are defined by $P_1, P_4,$ and $P_7,$ and a solid whose vertices are defined by $P_1, P_3,$ and $P_6$ are illustrated. In this way, various solids may be formed depending on the combination of reference colors. Accordingly, when an input color is given, a plurality solids containing the input color may be obtained. The candidate solid calculation unit 131 assumes that all sets of coordinates included in the color space as input colors, and extracts solids containing the respective input colors.

Each of N reference colors is represented by $\{(r_n, g_n, b_n), n=1, \ldots, N\}$, where $r_n$ is the R coordinate value of an n-th reference color $P_n$; $g_n$ is the G coordinate value of the n-th reference color $P_n$; and $b_n$ is the B coordinate value of the n-th reference color $P_n$. Further, the input color is represented by $(r_m, g_m, b_m)$. If a three-dimensional color space is assumed, the smallest solid containing an input color is a triangular pyramid having for vertices. Accordingly, in the following description, it is assumed that the shape of the solid is a triangular pyramid.

(Candidate Solid Calculation Unit 131)

When determining whether an input color is contained in a solid, the candidate solid calculation unit 131 calculates a center of gravity $(r_g, g_g, b_g)$ of the four reference colors defining the vertices of the solid. If the input color is contained in the solid, both the center of gravity of the solid and the input color are in the same one of two half-spaces separated by a face of the solid. Based on these characteristics, the candidate solid calculation unit 131 determines whether the direction from the center of the gravity of the solid toward each of the faces of the solid matches the direction from the input color toward each of the faces of the solid, and determines whether the input color is contained in the solid based on the determination result. If these two direction match, the candidate solid calculation unit 131 determines that the input color is contained in the solid.

For example, consider an equation of a plane represented by expression (1) below. Four coefficients $k_1, \ldots,$ and $k_4$ are given by expressions (2) through (5) below. Here, $(r_{n1}, g_{n1}, b_{n1}),$ $(r_{n2}, g_{n2}, b_{n2}),$ and $(r_{n3}, g_{n3}, b_{n3})$ are three vertices defining the plane.

There are four combinations of three out of four vertices of a triangular pyramid. The candidate solid calculation unit 131 determines, for each of these four combinations, whether the value of J obtained by assigning $(r_g, g_g, b_g)$ to $(r, g, b)$ and the value of J obtained by assigning $(r_m, g_m, b_m)$ to $(r, g, b)$ have the same sign.

If the J-values have the same sign in each of the combinations, the candidate solid calculation unit 131 determines that the input color $(r_m, g_m, b_m)$ is contained in the solid. On the other hand, if the J-values have different signs in at least one of the combinations, the candidate solid calculation unit 131 determines that the input color $(r_m, g_m, b_m)$ is not contained in the solid. The candidate solid calculation unit 131 performs this determination process for all the combinations of the reference colors.

$$J = k_1 \cdot r + k_2 \cdot g + k_3 \cdot b + k_4 \quad (1)$$

$$k_1 = (g_{n2} - g_{n1}) \cdot (b_{n3} - b_{n1}) - (g_{n3} - g_{n1}) \cdot (b_{n2} - b_{n1}) \quad (2)$$

$$k_2 = (b_{n2} - b_{n1}) \cdot (r_{n3} - r_{n1}) - (b_{n3} - b_{n1}) \cdot (r_{n2} - r_{n1}) \quad (3)$$

$$k_3 = (r_{n2} - r_{n1}) \cdot (g_{n3} - g_{n1}) - (r_{n3} - r_{n1}) \cdot (g_{n2} - g_{n1}) \quad (4)$$

$$k_4 = -(k_1 \cdot r_{n1} + k_2 \cdot g_{n1} + k_3 \cdot b_{n1}) \quad (5)$$

In the example of FIG. 5, the candidate solid calculation unit 131 may create a solid number list illustrated in FIG. 6 as the results of the determination processes described above. The solid number list is a table in which a set of coordinates in the color space is associated with a solid number of a solid containing the set of coordinates.

The candidate solid calculation unit 131 stores a set of coordinates of an input color contained in a solid and a solid number of the solid containing the input color in association with each other in the solid number list. If there are a plurality of solids that contain the same input color, a plurality of solid numbers are associated with the same set of coordinates as illustrated in FIG. 6.

Further, the candidate solid calculation unit 131 creates a coordinate list (see FIG. 7) that associates each vertex of each of the solids of the solid numbers stored in the solid number list with a set of coordinates of the vertex. The coordinate list is a table in which a vertex number identifying a reference color is associated with the coordinate values of the reference color in the color space.

Further, the candidate solid calculation unit 131 creates a vertex list (see FIG. 8) that associates each solid number stored in the solid number list with vertices of the solid having the solid number. The vertex list is a table in which a solid number identifying a solid is associated with four vertex numbers identifying the vertices of the solid. The solid number list, the coordinate list, and the vertex list are stored in the memory 102. By referring to these lists, it is possible to easily identify the coordinates of vertices of a solid and a solid containing given coordinates.

(Evaluation Unit 132)

In the following description, the solid number is represented by s, and the vertex numbers indicating four vertices of the solid with the solid number s are represented by $\{n_{s1}, n_{s2}, n_{s3}, n_{s4}\}$. The evaluation unit 132 calculates an evaluation value for each of the solids having the solid numbers stored in the solid number list. The smaller the solid is, the better (smaller) the evaluation value becomes. Note that a small solid is a solid having short edges. That is, among solids having the same volume, solids having shorter edges have smaller evaluation values. An evaluation value $J_s$ of the solid with the solid number s is given by, for example, expression (6) below.

Alternatively, the evaluation value $J_s$ may be obtained by expression (7) below. The evaluation value $J_s$ represented by expression (7) below is the sum of evaluation values $J_s$ represented by the expression (6) below with respect to all the coordinates of the color space. With this method, the evaluation unit 132 calculates an evaluation value $J_s$ for each of the solids of the solid numbers stored in the solid number list.

$$J_s = \sum_{\substack{i,j=1 \\ i \neq j}}^{4} \{(r_{nsi} - r_{nsj})^2 + (g_{nsi} - g_{nsj})^2 + (b_{nsi} - b_{nsj})^2\} \quad (6)$$

-continued $$J_s = \sum_{\substack{r,g,b=0 \\ (r,g,b) \in s}}^{255} \sum_{\substack{i,j=1 \\ i \neq j}}^{4} \{(r_{nsi} - r_{nsj})^2 + (g_{nsi} - g_{nsj})^2 + (b_{nsi} - b_{nsj})^2\} \quad (7)$$

(Solid Selection Unit 133 and Solid Removal Unit 134)

The evaluation value $J_s$ calculated by the evaluation unit 132 is input to the solid selection unit 133. The solid selection unit 133 extracts a solid having the smallest evaluation value $J_s$ for each of the coordinates stored in the solid number list. The solid selection unit 133 stores a solid number $s_{min}$ of the extracted solid in a selected-solid number list. The selected-solid number list is a list storing the solid number $s_{min}$ of the solid extracted by the evaluation unit 132. The selected-solid number list is stored in the memory 102.

For example, in the case of the solid number list of FIG. 6, two solid numbers 1 and 2 are associated with the coordinates (60, 50, ... ). In this case, the evaluation unit 132 compares an evaluation value $J_1$ of the solid with the solid number 1 and an evaluation value $J_2$ of the solid with the solid number 2, and stores the solid number of the solid having a smaller value in the selected-solid number list. For example, if the evaluation value $J_1$ is less than the evaluation value $J_2$ (if $s_{min}=1$), the solid selection unit 133 stores the solid number 1 in the selected-solid number list.

When the solid number $s_{min}$ is stored in the selected-solid number list, the solid removal unit 134 removes a solid number of a solid overlapping the solid with the solid number $s_{min}$ from the solid number list. Further, the solid removal unit 134 sores the solid number removed from the solid number list in a solid removal list. For example, if $s_{min}=1$, the solid removal unit 134 removes a solid number 3 of a solid (an overlapping solid) containing the same coordinates as the solid with the solid number 1 from the solid number list, as illustrated in FIG. 9. Further, the solid removal unit 134 removes the solid number $s_{min}$ from the solid number list, as illustrated in FIG. 9.

(Map Creation Unit 135)

The processing by the solid selection unit 133 and the solid removal unit 134 is repeated, so that an appropriate set of solids for filling the color space are selected. The map creation unit 135 creates a map (look-up table) for identifying a combination of reference colors to be used for interpolation of an arbitrary input color, based on the solid numbers stored in the selected-solid number list.

The map is created for each coordinate axis of the color space. For example, the map creation unit 135 creates a map $MP_R$ associating each R coordinate value with a solid number, a map $MP_G$ associating each G coordinate value with a solid number, and a map $MP_B$ associating each B coordinate value with a solid number.

For example, consider the case of creating the map $MP_R$. In this case, the map creation unit 135 refers to the solid number list, and extracts a solid number corresponding to each R coordinate value.

For example, if solid numbers 1 and 2 correspond to an R coordinate value 50 (R=50), the map creation unit 135 adds the R coordinate value (50) and the solid numbers 1 and 2 in association with each other to the map $MP_R$, as illustrated in FIG. 10. At this point, the map creation unit 135 does not consider the G coordinate value and the B coordinate value corresponding to the solid numbers 1 and 2. The same applies to other R coordinate values. Further, the map creation unit 135 creates the maps $MP_G$ and $MP_B$ in the same way. The table TBL including the maps $MP_R$, $MP_G$, and $MP_B$ is input to the image correction unit 112.

In the above-described creation process, the map creation unit 135 extracts, for each of the solids of the solid numbers stored in the solid number list, the maximum value and the minimum value of each of the coordinate values in the region occupied by the solid, and associates each of coordinate values in a rage between the extracted maximum and minimum values with a solid number, for example. Each of these maximum and minimum values is any one of the coordinate values of the vertices of the solid. Accordingly, by comparing the coordinate values of the four vertices of a solid, it is possible to easily obtain the maximum and minimum values of the R coordinate value, the maximum and minimum values of the G coordinate value, and the maximum and minimum values of the B coordinate value.

The above is the functions of the table creation unit 111.

(General Flow of Process)

Figure 11:
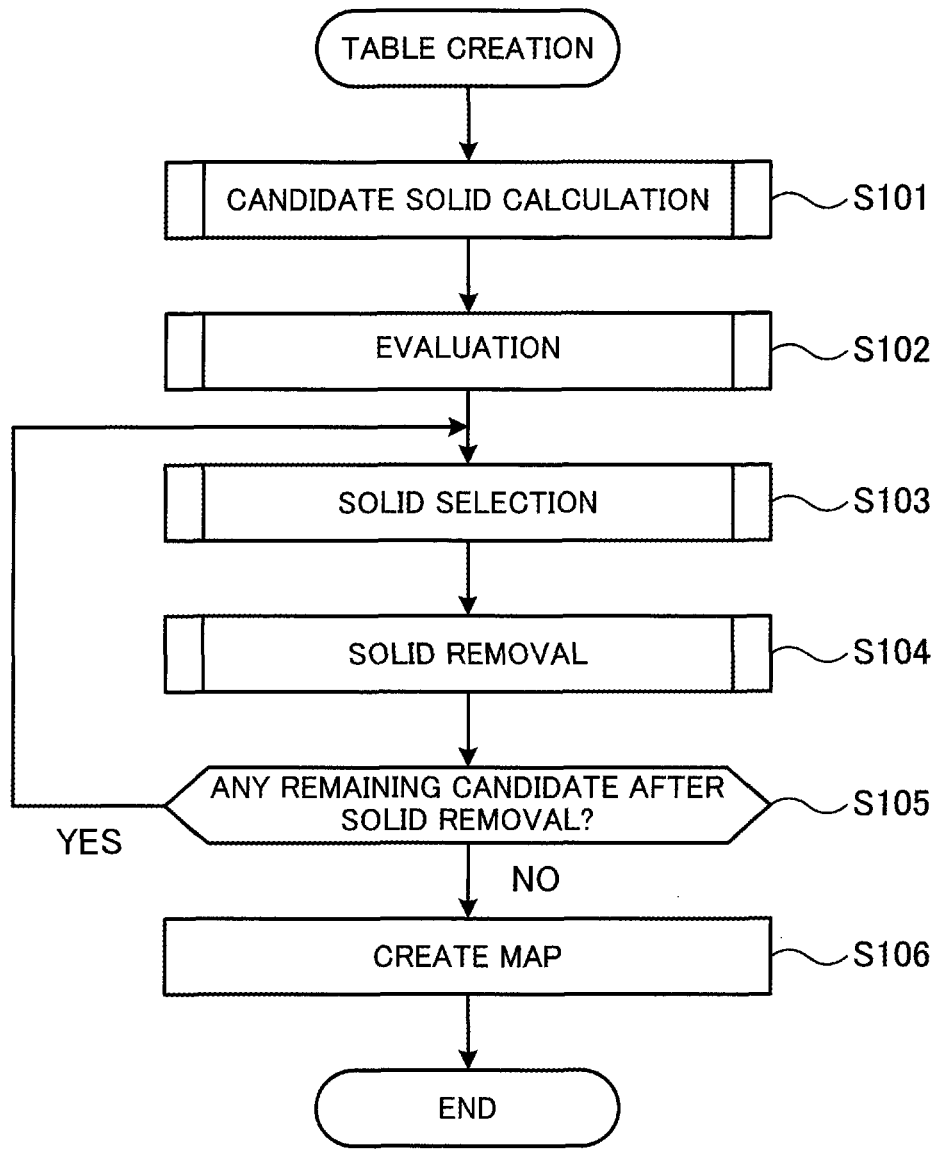
FIG. 11 is a flowchart illustrating the flow of a table creation process according to the second embodiment.

The following describes the flow of the process performed by the table creation unit 111 with reference to FIG. 11. FIG. 11 is a flowchart illustrating the flow of a table creation process according to the second embodiment.

As illustrated in FIG. 11, the table creation unit 111 causes the candidate solid calculation unit 131 to extract solids containing each set of coordinates of the color space as candidate solids, and store information associating solid numbers of the extracted candidate solids with coordinates in the solid number list (S101).

Then, the table creation unit 111 causes the evaluation unit 132 to calculate an evaluation value $J_s$ represented by the above expression (6) or (7) for the solid with the solid number s on the solid number list (S102).

Then, the table creation unit 111 causes the solid selection unit 133 to select a candidate solid having the smallest evaluation value $J_s$ among the candidate solids containing the same coordinates, and store a solid number of the selected candidate solid in the selected-solid number list (S103).

Then, the table creation unit 111 causes the solid removal unit 134 to extract a solid overlapping the solid with the solid number stored in the selected-solid number list, and remove a solid number of the extracted solid from the solid number list (S104). Further, the table creation unit 111 causes the solid removal unit 134 to store the solid number removed from the solid number list in the solid removal list. Further, the table creation unit 111 causes the solid removal unit 134 to remove the solid number stored in the selected-solid number list from the solid number list.

Then, the table creation unit 111 determines whether there is a remaining candidate solid after the operation of step S104 (S105). If there is a remaining candidate solid, the process returns to step S103. On the other hand, if there is no remaining candidate solid, the process proceeds to step S106. When the process proceeds to step S106, the table creation unit 111 causes the map creation unit 135 to create a map based on the selected-solid number list (S106). The map created in step S106 is input to the image correction unit 112. Further, when the operation of step S106 completes, a series of operations illustrated in FIG. 11 ends.

The above is a description of the general flow of the process performed by the table creation unit 111.

(Candidate Solid Calculation)

Figure 12:
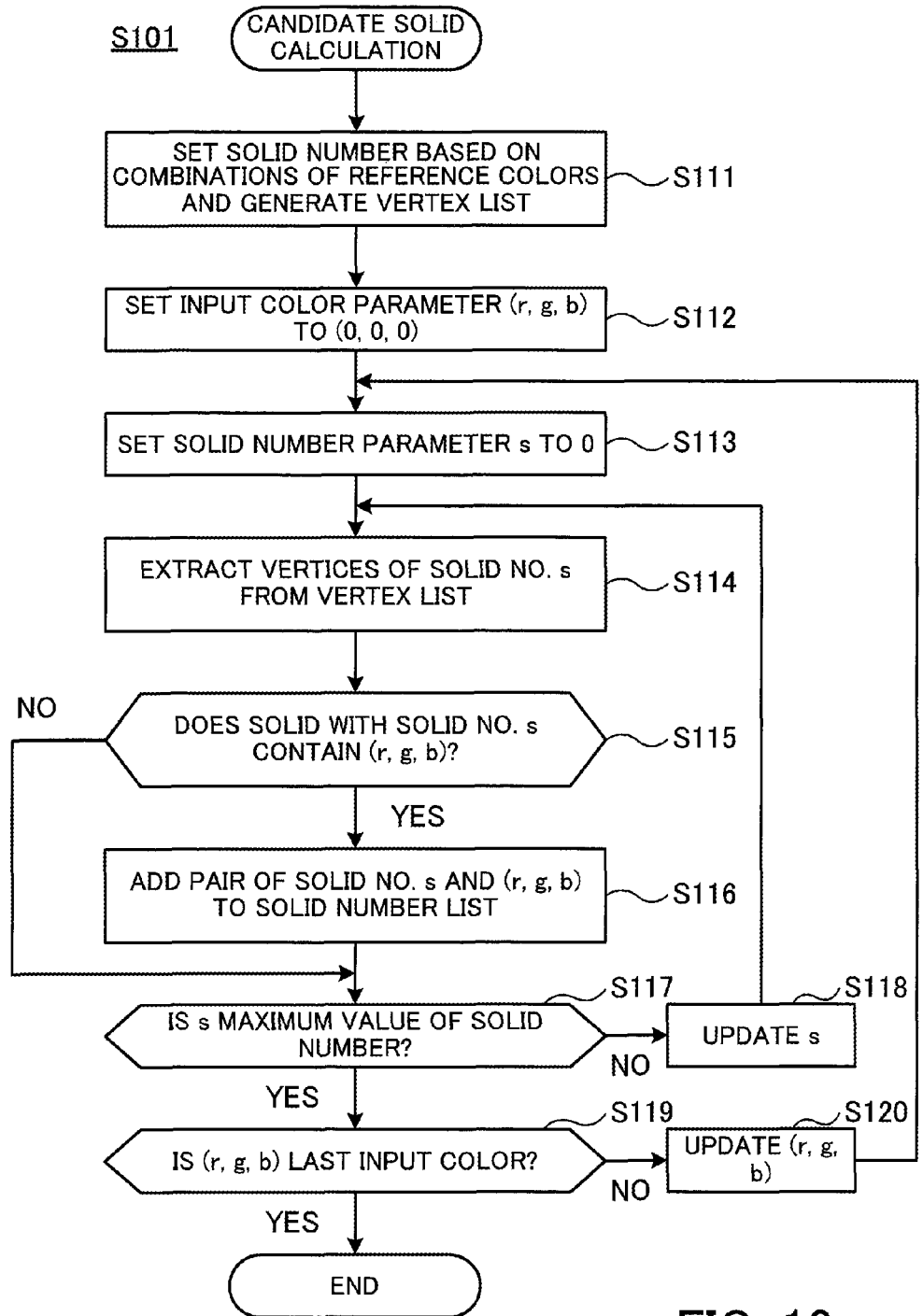
FIG. 12 is a flowchart illustrating the flow of a candidate solid calculation process according to the second embodiment.

The process of step S101 will now be further described with reference to FIG. 12. FIG. 12 is a flowchart illustrating the flow of a candidate solid calculation process according to the second embodiment. The process illustrated in FIG. 12 is performed by the candidate solid calculation unit 131.

As illustrated in FIG. 12, the candidate solid calculation unit 131 sets solid numbers based on combinations of reference colors (S111). For example, the candidate solid calculation unit 131 sequentially selects a combination of four reference colors, and sequentially assigns a solid whose vertices are defined by the selected reference colors with a solid number. Further, in the operation of step S111, the candidate solid calculation unit 131 generates a vertex list that associates the solid number with the vertices, using vertex numbers identifying the reference colors on the vertices.

Then, the candidate solid calculation unit 131 sets a parameter (input color parameter (r, g, b)) for identifying the input color to (0, 0, 0) (S112). Then, the candidate solid calculation unit 131 sets a parameter for specifying a solid number (solid number parameter s) to 0. Then, the candidate solid calculation unit 131 extracts the vertices of the solid with the solid number s from the vertex list (S114).

Then, the candidate solid calculation unit 131 determines whether the solid with the solid number s contains the input color (r, g, b) (S115). If the solid with the solid number s contains the input color (r, g, b), the process proceeds to step S116. On the other hand, if the solid with the solid number s does not contain the input color (r, g, b), the process proceeds to step S117. When the process proceeds to step S116, the candidate solid calculation unit 131 adds a pair of the solid number s and the input color (r, g, b) to the solid number list (S116). When the operation of step S116 completes, the process proceeds to step S117.

When the process proceeds to step S117, the candidate solid calculation unit 131 determines whether s is the maximum value of the solid number (S117). If s is the maximum value of the solid number, the process proceeds to step S119. On the other hand, if s is not the maximum value of the solid number, the process proceeds to step S118. When the process proceeds to step S118, the candidate solid calculation unit 131 performs update processing that increments s by 1 (S118). When the operation of step S118 completes, the process returns to step S114.

When the process proceeds to step S119, the candidate solid calculation unit 131 determines whether (r, g, b) is the last input color (S119). If (r, g, b) is the last input color, a series of operations illustrated in FIG. 12 ends. On the other hand, if (r, g, b) is not the last input color, the process proceeds to step S120.

When the process proceeds to step S120, the candidate solid calculation unit 131 performs update processing that changes (r, g, b) to the next coordinates (S120). For example, if the direction of scanning the color space is determined in advance, the values of (r, g, b) are changed so as to specify the adjacent coordinates in the scanning direction. When the operation of step S120 completes, the process returns to step S113.

The above is a description of the process of step S101.

(Evaluation and Solid Selection)

Figure 13:
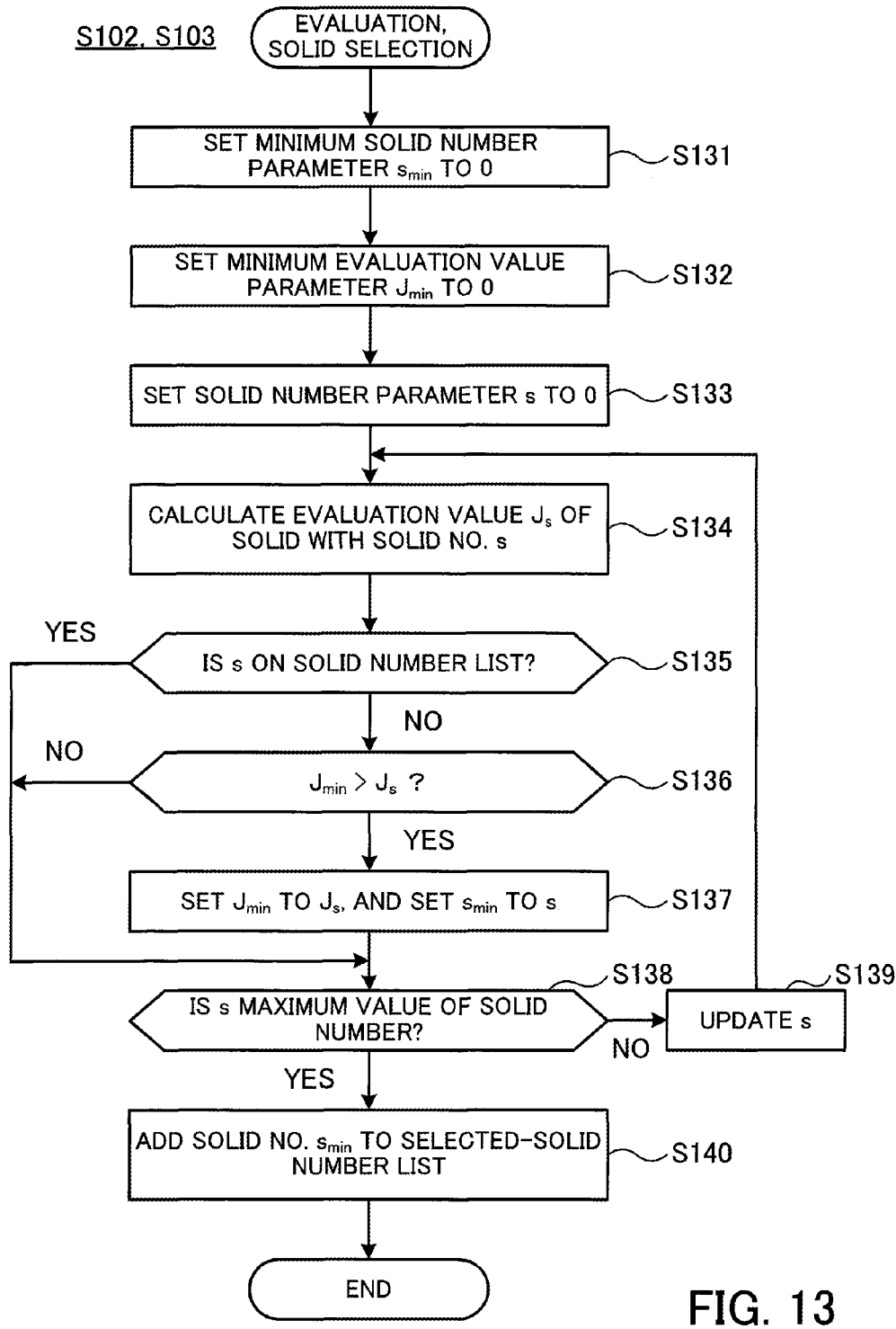
FIG. 13 is a flowchart illustrating the flow of an evaluation process and a solid selection process according to the second embodiment.

The processes of steps S102 and S103 will now be further described with reference to FIG. 13. FIG. 13 is a flowchart illustrating the flow of an evaluation process and a solid selection process according to the second embodiment. The processes illustrated in FIG. 13 are performed by the evaluation unit 132 and the solid selection unit 133.

As illustrated in FIG. 13, the evaluation unit 132 sets a minimum solid number parameter $s_{min}$ for identifying a solid number having the smallest evaluation value to 0 (S131). Then, the evaluation unit 132 sets a minimum evaluation value parameter $J_{min}$ used for calculating the smallest evaluation value to 0 (S132). Then, the evaluation unit 132 sets a solid number parameter s for specifying a solid number to 0 (S133). It is to be noted that steps S131, S132, and S133 may be performed in any order.

Then, the evaluation unit 132 calculates an evaluation value $J_s$ of the solid with the solid number s (S134). For example, the evaluation unit 132 calculates the evaluation value $J_s$ based on the above expression (6) or (7). Then, the solid selection unit 133 determines whether the solid number s is on the solid number list (S135). If the solid number s is on the solid number list, the process proceeds to step S138. On the other hand, if the solid number s is not on the solid number list, the process proceeds to step S136.

When the process proceeds to step S136, the solid selection unit 133 compares the minimum evaluation value parameter $J_{min}$ and the evaluation value $J_s$, and determines whether the minimum evaluation value parameter $J_{min}$ is greater than the evaluation value $J_s$ (S136). If the minimum evaluation value parameter $J_{min}$ is greater than the evaluation value $J_s$, the process proceeds to step S137. On the other hand, if the minimum evaluation value parameter $J_{min}$ is not greater than the evaluation value $J_s$, the process proceeds to step S138.

When the process proceeds to step S137, the solid selection unit 133 sets the minimum evaluation value parameter $J_{min}$ to $J_s$, and sets the minimum solid number parameter $s_{min}$ to s (step S137). When the operation of step S137 completes, the process proceeds to step S138. When the process proceeds to step S138, the solid selection unit 133 determines whether s is the maximum value of the solid number (S138). When s is the maximum value of the solid number, the process proceeds to step S140. On the other hand, if s is not the maximum value of the solid number, the process proceeds to step S139.

When the process proceeds to step S139, the solid selection unit 133 performs update processing that increments s by 1 (S139). When the processing of step S139 completes, the process returns to step S134. When the process proceeds to step S140, the solid selection unit 133 adds the solid number $s_{min}$ to the selected-solid number list (S140). When the operation of step S140 completes, a series of operations illustrated in FIG. 13 ends.

The above is a description of the processes of step S102 and S103.

(Solid Removal)

Figure 14:
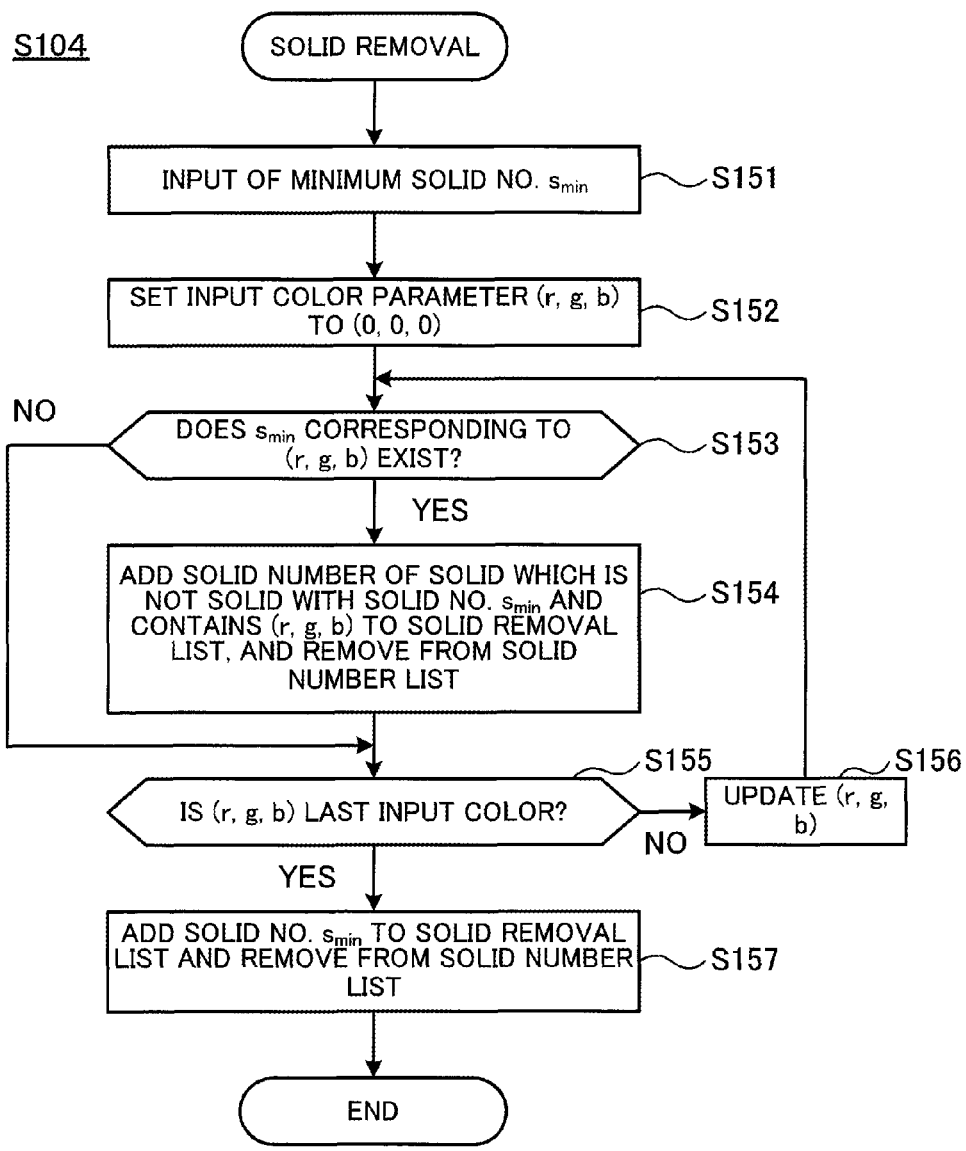
FIG. 14 is a flowchart illustrating the flow of a solid removal process according to the second embodiment.

The process of step S104 will now be further described with reference to FIG. 14. FIG. 14 is a flowchart illustrating the flow of a solid removal process according to the second embodiment. The process illustrated in FIG. 14 is performed by the solid removal unit 134.

As illustrated in FIG. 14, the solid removal unit 134 receives an input of the minimum solid number $s_{min}$ (S151). In this step, the minimum solid number $s_{min}$ stored in the selected-solid number list is input. Then, the solid removal unit 134 sets an input color parameter (r, g, b) for specifying the input color to (0, 0, 0) (S152).

Then, the solid removal unit 134 determines whether there is $s_{min}$ corresponding to (r, g, b) (S153). If there is $s_{min}$ corresponding to (r, g, b), the process proceeds to step S154. On the other hand, if there is no $s_{min}$ corresponding to (r, g, b), the process proceeds to step S155. When the process proceeds to step S154, the solid removal unit 134 adds a solid number of a solid which is not the solid with the solid number $s_{min}$ and contains (r, g, b) to the solid removal list, and removes the solid number from the solid number list (S154). When the operation of step S154 completes, the process proceeds to step S155.

When the process proceeds to step S155, the solid removal unit 134 determines whether (r, g, b) is the last input color (S155). If (r, g, b) is the last input color, the process proceeds to step S157. On the other hand, if (r, g, b) is not the last input color, the process proceeds to step S156. When the process proceeds to step S156, the solid removal unit 134 performs update processing that changes (r, g, b) to the next coordinates (S156). When the operation of step S156 completes, the process returns to step S153.

When the process proceeds to step S157, the solid removal unit 134 adds the solid number $s_{min}$ to the solid removal list, and removes the solid number $s_{min}$ from the solid number list (S157). When the operation of step S157 completes, a series of operations illustrated in FIG. 14 ends.

The above is a description of the process of step S104.

The above is a description of the table creation unit 111.

(2-2-2) Image Correction Unit

The following describes the image correction unit 112.

(Functional Blocks)

The functions of the image correction unit 112 will be further described with reference to FIG. 15. In the following description, FIGS. 16 through 18 will be referred to as needed.

Figure 15:
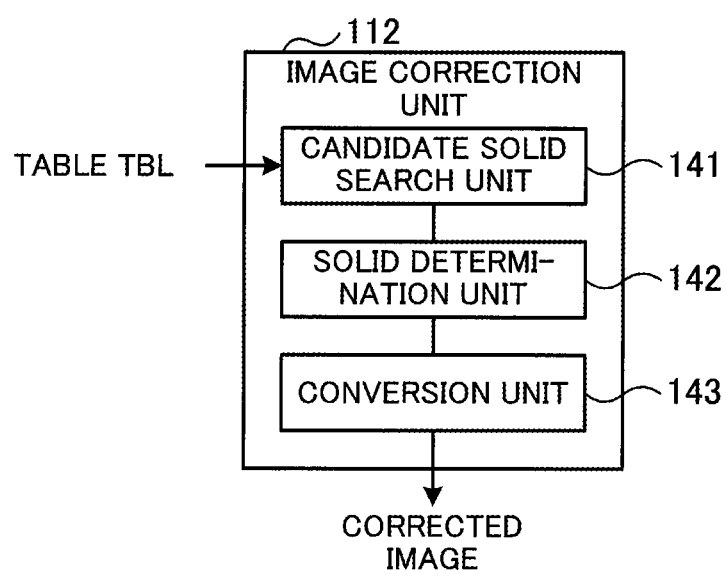
FIG. 15 is a block diagram illustrating an example of functions of an image correction unit according to the second embodiment.
Figure 16:
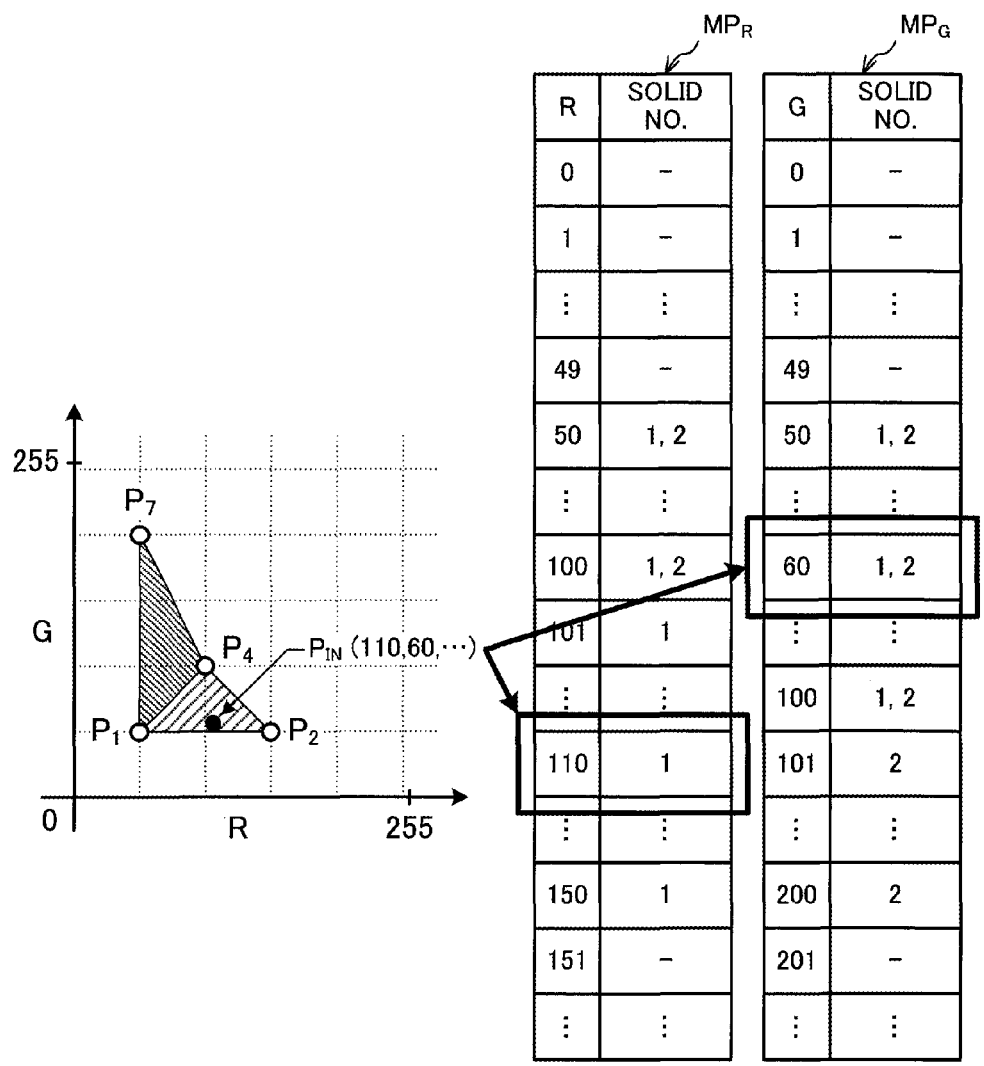
FIG. 16 illustrates a candidate solid search process according to the second embodiment.
Figure 17:
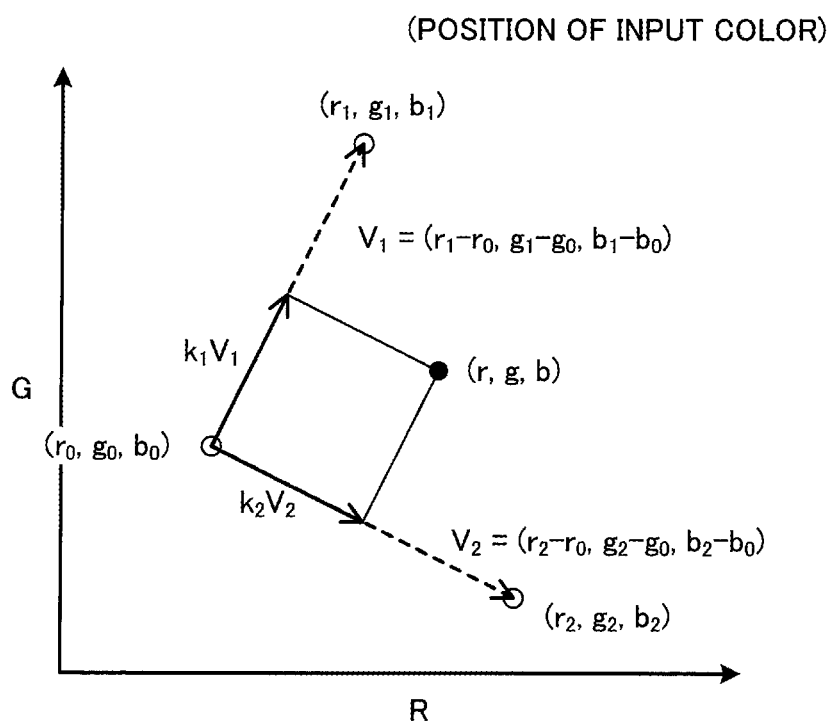
FIG. 17 is a first diagram illustrating a conversion process according to the second embodiment.
Figure 18:
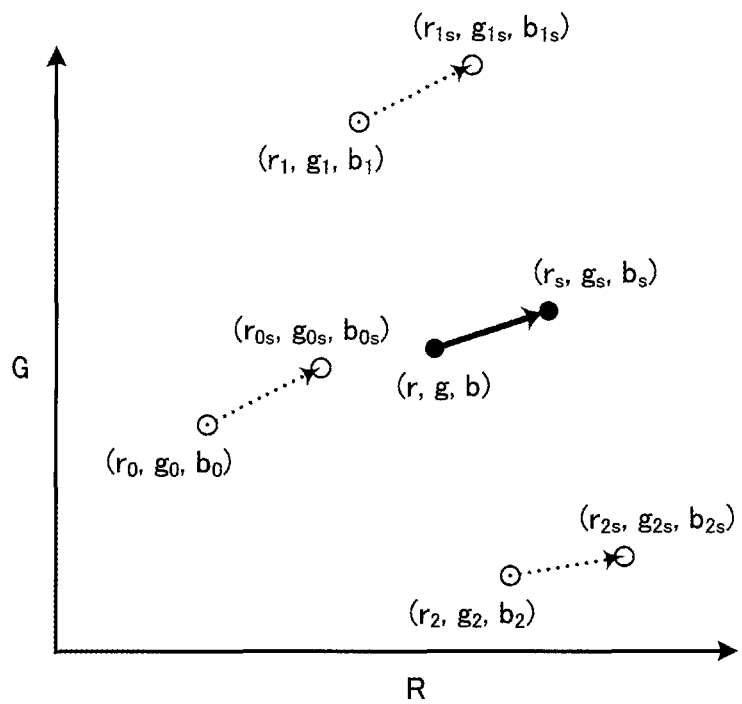
FIG. 18 is a second diagram illustrating the conversion process according to the second embodiment.

FIG. 15 is a block diagram illustrating an example of functions of the image correction unit 112 according to the second embodiment. FIG. 16 illustrates a candidate solid search process according to the second embodiment. FIG. 17 is a first diagram illustrating a conversion process according to the second embodiment. FIG. 18 is a second diagram illustrating the conversion process according to the second embodiment.

As illustrated in FIG. 15, the image correction unit 112 includes a candidate solid search unit 141, a solid determination unit 142, and a conversion unit 143. The functions of the candidate solid search unit 141, the solid determination unit 142, and the conversion unit 143 are implemented by the CPU 101 and the memory 102 described above. The image correction unit 112 stores the table (look-up table) created by the table creation unit 111 and including a plurality of maps.

The candidate solid search unit 141 acquires color information on an input color of an arbitrary pixel included in an image, and calculates candidate reference colors to be used for interpolation of the input color by referring to the maps. The image may be one obtained from the imaging apparatus 52 or may be one stored in advance in the memory 102 or the storage medium 51. In the case where there are a plurality of candidate combinations of reference colors, the solid determination unit 142 selects one of the plurality of candidate combinations. The conversion unit 143 performs color correction for the input color by performing interpolation processing based on the combination of reference colors selected by the solid determination unit 142.

The functions of the image correction unit 112 will now be further described in connection with an example in which maps $MP_R$, $MP_G$, and $MP_B$ of FIG. 16 are provided (the map $MP_B$ is omitted in FIG. 16). Further, color correction processing will be further described with reference to FIGS. 17 and 18.

(Candidate Solid Search Unit 141 and Solid Determination Unit 142)

The candidate solid search unit 141 refers to the maps $MP_R$, $MP_G$, and $MP_B$, and extracts a solid containing an input color as a candidate solid. In the example of FIG. 16, an input color $P_{IN}(110, 60, \ldots)$ is given. In this case, the candidate solid search unit 141 extracts a solid number corresponding to the R coordinate value (110) of the input color $P_{IN}$ from the map $MP_R$. In the example of FIG. 16, a solid number {1} is extracted.

Similarly, the candidate solid search unit 141 extracts a solid number corresponding to the G coordinate value (60) of the input color $P_{IN}$ from the map $MP_G$. In the example of FIG.

16, two solid numbers {1, 2} are extracted. Similarly, the candidate solid search unit 141 extracts a solid number corresponding to the B coordinate value of the input color $P_{IN}$.

The candidate solid search unit 141 generates a product set ({1}^{1, 2}^{ . . . }) of the solid number {1} corresponding to the R coordinate value (110), the solid numbers {1, 2} corresponding to the G coordinate value (60), and the solid number { . . . } corresponding to the B coordinate value. If the solid number { . . . } corresponding to the B coordinate value includes 1, the product set is {1}. Note that "^" represents a logical AND. In this way, the candidate solid search unit 141 extracts a candidate solid containing the input color $P_{IN}$, using the three maps $MP_R$, $MP_G$, and $MP_B$. Note that in the case where a plurality of candidate solids are extracted, the solid determination unit 142 extracts one of the candidate solids containing the input color $P_{IN}$.

The solid determination unit 142 selects a candidate solid containing the input color $P_{IN}$ from the plurality of candidate solids. This selection process is implemented based on the above expressions (1) through (5). That is, similar to the candidate solid calculation unit 131 of the table creation unit 111, the solid determination unit 142 calculates the coordinates of the center of gravity of the candidate solids, and compares the sing of the value of J obtained by assigning the input color $P_{IN}$ to the above expression (1) and the sign of the value of J obtained by assigning the coordinates of the center of gravity to the above expression (1). Then, the solid determination unit 142 extracts a candidate solid whose two J-values have the same sign. The extracted candidate solid is input to the conversion unit 143 as a solid to be used for color correction of the input color $P_{IN}$.

(Conversion Unit 143)

The conversion unit 143 performs color correction of the input color $P_{IN}$, using the reference colors located on the vertices of the solid input from the solid determination unit 142. For example, as illustrated in FIG. 17, the coordinates of the input color $P_{IN}$ are represented by (r, g, b), and four reference colors $P_0$, $P_1$, $P_2$, and $P_3$ used for color correction are represented by $(r_0, g_0, b_0)$, $(r_1, g_1, b_1)$, $(r_2, g_2, b_2)$, and $(r_3, g_3, b_3)$. Note that in the example of FIG. 17, $P_3$ is omitted.

Further, a vector $V_1$ from $P_0$ to $P_1$ is $(r_1-r_0, g_1-g_0, b_1-b_0)$. Further, a vector $V_2$ from $P_0$ to $P_2$ is $(r_2-r_0, g_2-g_0, b_2-b_0)$. Further, a vector $V_3$ from $P_0$ to $P_3$ is $(r_3-r_0, g_3-g_0, b_3-b_0)$. Note that conversion represented by vectors $V_1$, $V_2$, and $V_3$ is given in advance. Further, the input color $P_{IN}(r, g, b)$ is represented by expression (8-1) below, using coefficients $h_1$, $h_2$, and $h_3$.

$$\begin{bmatrix} r \\ g \\ b \end{bmatrix} = \begin{bmatrix} r_1-r_0 & r_2-r_0 & r_3-r_0 \\ g_1-g_0 & g_2-g_0 & g_3-g_0 \\ b_1-b_0 & b_2-b_0 & b_3-b_0 \end{bmatrix} \begin{bmatrix} h_1 \\ h_2 \\ h_3 \end{bmatrix} + \begin{bmatrix} r_0 \\ g_0 \\ b_0 \end{bmatrix} \quad (8\text{-}1)$$

Since the three vectors $V_1$, $V_2$, and $V_3$ are obtained from the coordinates of the reference colors, when the coordinates of the input color $P_{IN}$ are given, the coefficients $h_1$, $h_2$, and $h_3$ are obtained from expression (8-2) below which is obtained by modifying the above expression (8-1). Note that the superscript "−1" denotes the inverse matrix.

$$\begin{bmatrix} h_1 \\ h_2 \\ h_3 \end{bmatrix} = \begin{bmatrix} r_1-r_0 & r_2-r_0 & r_3-r_0 \\ g_1-g_0 & g_2-g_0 & g_3-g_0 \\ b_1-b_0 & b_2-b_0 & b_3-b_0 \end{bmatrix}^{-1} \begin{bmatrix} r-r_0 \\ g-g_0 \\ b-b_0 \end{bmatrix} \quad (8\text{-}2)$$

The coordinates of the original colors corresponding to the reference colors $P_0, \ldots,$ and $P_3$ (the coordinates that are set in advance for the reference colors) are represented by $(r_{0s}, g_{0s}, b_{0s})$, $(r_{1s}, g_{1s}, b_{1s})$, $(r_{2s}, g_{2s}, b_{2s})$, and $(r_{3s}, g_{3s}, b_{3s})$. Using these representations, the coordinates $(r_s, g_s, b_s)$ of the input color $P_{IN}$ after color correction are given by expression (9) below. The conversion unit 143 calculates the coefficients $h_1$, $h_2$, and $h_3$ based on the above expression (8-2), and performs color correction for converting the input color $P_{IN}$ to the original color based on expression (9) below, as illustrated in FIG. 18.

$$\begin{bmatrix} r_s \\ g_s \\ b_s \end{bmatrix} = \begin{bmatrix} r_{1s}-r_{0s} & r_{2s}-r_{0s} & r_{3s}-r_{0s} \\ g_{1s}-g_{0s} & g_{2s}-g_{0s} & g_{3s}-g_{0s} \\ b_{1s}-b_{0s} & b_{2s}-b_{0s} & b_{3s}-b_{0s} \end{bmatrix} \begin{bmatrix} h_1 \\ h_2 \\ h_3 \end{bmatrix} + \begin{bmatrix} r_{0s} \\ g_{0s} \\ b_{0s} \end{bmatrix} \quad (9)$$

The above is a description of the image correction unit 112.

(General Flow of Process)

Figure 19:
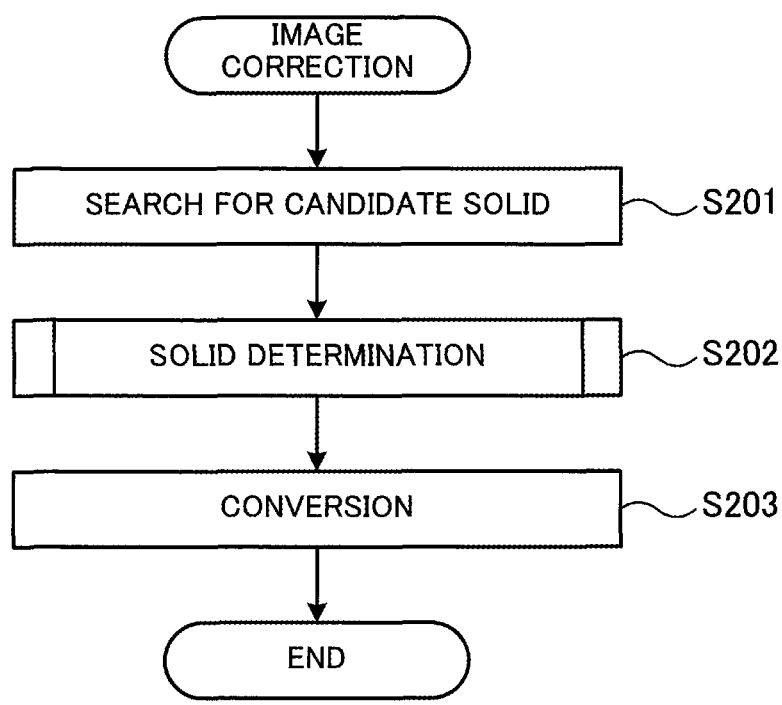
FIG. 19 is a flowchart illustrating the flow of an image correction process according to the second embodiment.

The following describes the flow of the process performed by the image correction unit 112 with reference to FIG. 19. FIG. 19 is a flowchart illustrating the flow of an image correction process according to the second embodiment.

As illustrated in FIG. 19, the image correction unit 112 causes the candidate solid search unit 141 to refer to the maps $MP_R$, $MP_G$, and $MP_B$ created by the table creation unit 111, and extract solids containing the input color $P_{IN}$ as candidate solids (S201). Then, the image correction unit 112 causes the solid determination unit 142 to select a solid containing the input color $P_{IN}$ from the candidate solids extracted in step S201 (S202).

Then, the image correction unit 112 causes the conversion unit 143 to perform color correction of the input color $P_{IN}$, using conversion of the reference colors located on the vertices of the solid selected in step S202 (S203). When the operation of step S203 completes, a series of operations illustrated in FIG. 19 ends.

(Solid Determination)

Figure 20:
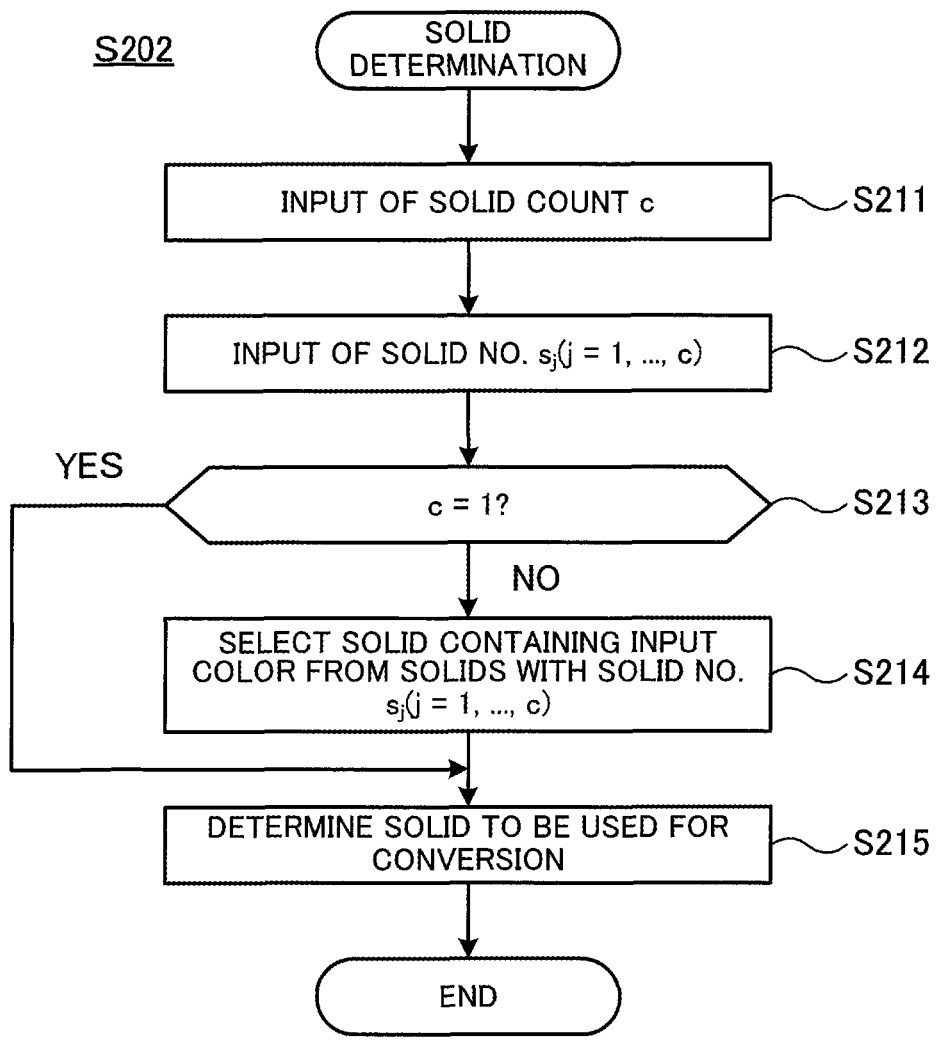
FIG. 20 is a flowchart illustrating the flow of a solid determination process according to the second embodiment.

The process of step S202 will now be further described with reference to FIG. 20. FIG. 20 is a flowchart illustrating the flow of a solid determination process according to the second embodiment. The process illustrated in FIG. 20 is performed by the solid determination unit 142.

As illustrated in FIG. 20, the solid determination unit 142 receives an input of a solid count c representing the number of candidate solids (S211). Further, the solid determination unit 142 receives a solid number $s_j$ (j=1, . . . , c) identifying each candidate solid (S212). Then, the solid determination unit 142 determines whether c is 1 (S213). If c is 1, the solid determination unit 142 selects the solid with the solid number $s_1$, and the process proceeds to step S215. On the other hand, if c is not 1, the process proceeds to step S214.

When the process proceeds to step S214, the solid determination unit 142 selects a solid containing the input color from solids with solid numbers $s_j$ (j=1, . . . , c) (S214). When the operation of step S214 completes, the process proceeds to step S215. When the process proceeds to step S215, the solid determination unit 142 determines the selected solid as a solid to be used for conversion of the input color (S215). When the operation of step S215 completes, a series of operations illustrated in FIG. 20 ends.

The above is a description of the process of step S202.

The above is a description of the image correction unit 112.

(2-3) Modification #1 (Combined Use a of Non-Map-Using System)

Figure 21:
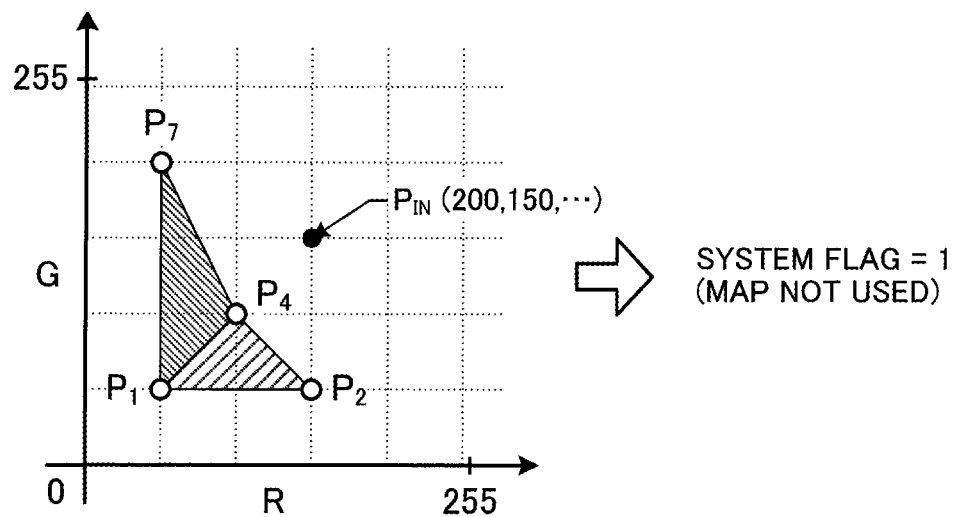
FIG. 21 illustrates a modified example (modification #1) of the second embodiment.
Figure 22:
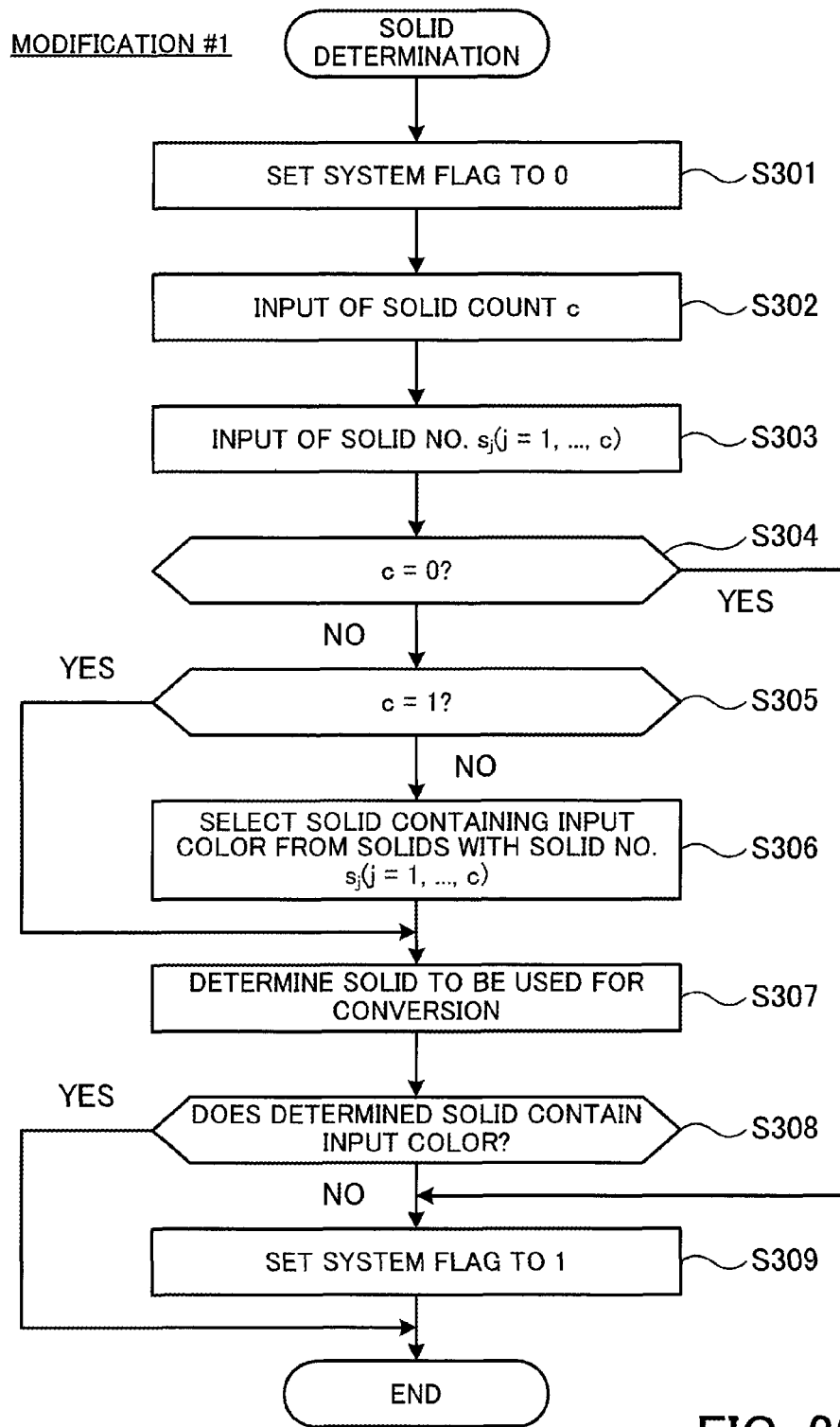
FIG. 22 is a flowchart illustrating the flow of a solid determination process according to the modified example (modification #1) of the second embodiment.

A modified example (modification #1) of the second embodiment will now be described with reference to FIGS. 21 and 22. The modification #1 relates to a method to which a process is added that is performed in the case where an input color is located outside the region filled with solids whose vertices are defined by reference colors. FIG. 21 illustrates the modified example (modification #1) of the second embodiment. FIG. 22 is a flowchart illustrating the flow of a solid determination process according to the modified example (modification #1) of the second embodiment.

The above description is based on the assumption that the input color is contained in any of solids whose vertices are defined by reference colors. That is, in the case where there is no solid containing the input color, color correction processing for the input color is optional. The modification #1 proposes a system (hereinafter "non-map-using system") that performs color correction of the input color $P_{IN}$ without using the maps $MP_R$, $MP_G$, and $MP_B$ in the case where there is no solid containing the input color (see FIG. 21).

In the case of applying the modification #1, the above-described solid process is modified as illustrated in FIG. 22. The conversion unit 143 selects a method for color correction (a system using maps or the non-map-using system) based on a system flag that is set in the process illustrated in FIG. 22. The system flag is a flag that is referred to when selecting a method for color correction. The non-map-using system is selected when the system flag is 1, and the color correction method using maps is selected when the system flag is 0.

As illustrated in FIG. 22, the solid determination unit 142 sets the system flag to 0 (S301). Further, the solid determination unit 142 receives an input of a solid count c representing the number of candidate solids (S302). Further, the solid determination unit 142 receives a solid number $s_j$ (j=1, ..., c) identifying each candidate solid (S303). Note that when c is 0, the solid number $s_j$ (j=1, ..., c) is not input.

Then, the solid determination unit 142 determines whether c is 0 (S304). If c is 0, the process proceeds to step S309. On the other hand, if c is not 0, the process proceeds to step S305. When the process proceeds to step S305, the solid determination unit 142 determines whether c is 1 (S305). If c is 1, the solid determination unit 142 selects the solid with the solid number $s_1$, and the process proceeds to step S307. On the other hand, if c is not 1, the process proceeds to step S306.

When the process proceeds to step S306, the solid determination unit 142 selects a solid containing the input color from solids with solid numbers $s_j$ (j=1, ..., c) (S306). When the operation of step S306 completes, the process proceeds to step S307. When the process proceeds to step S307, the solid determination unit 142 determines the selected solid as a solid to be used for conversion of the input color (S307).

Then, the solid determination unit 142 determines whether the solid determined in step S307 contains the input color (S308). If the solid determined in step S307 contains the input color, a series of operations illustrated in FIG. 22 ends. On the other hand, if the solid determined in step S307 does not contain the input color, the process proceeds to step S309. When the process proceeds to step S309, the solid determination unit 142 sets the system flag to 1 (S309). When the operation of step S309 completes, a series of operations illustrated in FIG. 22 ends.

The above is a description of the modification #1.

(2-4) Modification #2 (Combined Use B of Non-Map-Using System)

Next, another modified example (modification #2) of the second embodiment will be described with reference to FIGS. 23 and 24. The modification #2 relates to a system that sets, upon generating a map, a system selection flag indicating whether an evaluation value J of a solid is less than a threshold Th or greater than the threshold Th, and selects a color correction method using a system selection map associating the system selection flag and a solid number.

The system selection flag is a flag that is referred to when selecting a method for color correction. The non-map-using system is selected when the system selection flag is 1, and the color correction method using maps is selected when the system selection flag is 0. Upon applying the modification #2, the evaluation process and the solid selection process performed by the table creation unit 111 are modified as illustrated in FIG. 23. Further, upon applying the modification #2, the solid determination process performed by the image correction unit 112 is modified as illustrated in FIG. 24. These processes will be described below.

(Evaluation and Solid Selection)

The evaluation process and the solid selection process according to the modification #2 will be described with reference to FIG. 23. FIG. 23 is a flowchart illustrating the flow of the evaluation process and the solid selection process according to the other modified example (modification #2) of the second embodiment. The processes illustrated in FIG. 23 are performed by the evaluation unit 132 and the solid selection unit 133.

Figure 23:
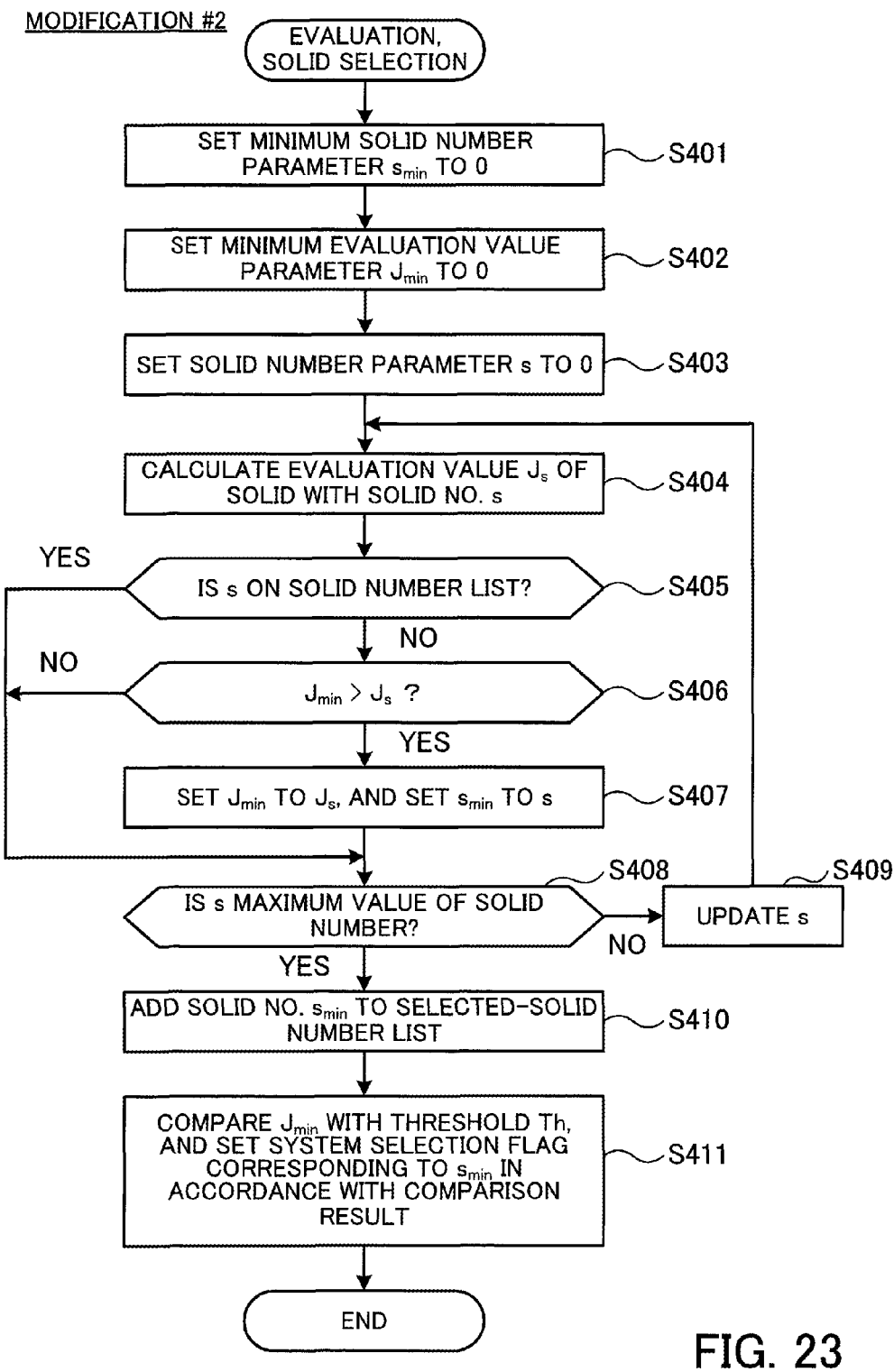
FIG. 23 is a flowchart illustrating the flow of an evaluation process and a solid selection process according to another modified example (modification #2) of the second embodiment.

As illustrated in FIG. 23, the evaluation unit 132 sets a minimum solid number parameter $s_{min}$ for identifying a solid number having the smallest evaluation value to 0 (S401). Then, the evaluation unit 132 sets a minimum evaluation value parameter $J_{min}$ used for calculating the smallest evaluation value to 0 (S402). Then, the evaluation unit 132 sets a solid number parameter s for specifying a solid number to 0 (S403). Note that steps S401, S402, and S403 may be performed in any order.

Then, the evaluation unit 132 calculates an evaluation value $J_s$ of the solid with the solid number s (S404). For example, the evaluation unit 132 calculates the evaluation value $J_s$ based on the above expression (6) or (7). Then, the solid selection unit 133 determines whether the solid number s is on the solid number list (S405). If the solid number s is on the solid number list, the process proceeds to step S408. On the other hand, if the solid number s is not on the solid number list, the process proceeds to step S406.

When the process proceeds to step S406, the solid selection unit 133 compares the minimum evaluation value parameter $J_{min}$ and the evaluation value $J_s$, and determines whether the minimum evaluation value parameter $J_{min}$ is greater than the evaluation value $J_s$ (S406). If the minimum evaluation value parameter $J_{min}$ is greater than the evaluation value $J_s$, the process proceeds to step S407. On the other hand, if the minimum evaluation value parameter $J_{min}$ is not greater than the evaluation value $J_s$, the process proceeds to step S408.

When the process proceeds to step S407, the solid selection unit 133 sets the minimum evaluation value parameter $J_{min}$ to $J_s$, and sets the minimum solid number parameter $s_{min}$ to s (step S407). When the operation of step S407 completes, the process proceeds to step S408. When the process proceeds to step S408, the solid selection unit 133 determines whether s is the maximum value of the solid number (S408). When s is the maximum value of the solid number, the process proceeds to step S410. On the other hand, if s is not the maximum value of the solid number, the process proceeds to step S409.

When the process proceeds to step S409, the solid selection unit 133 performs update processing that increments s by 1 (S409). When the operation of step S409 completes, the process returns to step S404. When the process proceeds to step S410, the solid selection unit 133 adds the solid number $s_{min}$ to the selected-solid number list (S410). Then, the solid selection unit 133 compares $J_{min}$ with the threshold Th, and sets a system selection flag corresponding to the solid number $s_{min}$ in accordance with the comparison result (S411).

For example, the solid selection unit 133 sets the system selection flag to 1 if $J_{min}$ is greater than the threshold Th, and sets the system selection flag to 0 if $J_{min}$ is less than the threshold Th. The threshold Th is set in advance. The set system selection flag is stored in association with the solid number in the system selection map. The system selection map is input to the table creation unit 111. When the operation of step S411 completes, a series of operations illustrated in FIG. 23 ends.

The above is a description of the evaluation process and the solid selection process according to the modification #2.

(Solid Determination)

Figure 24:
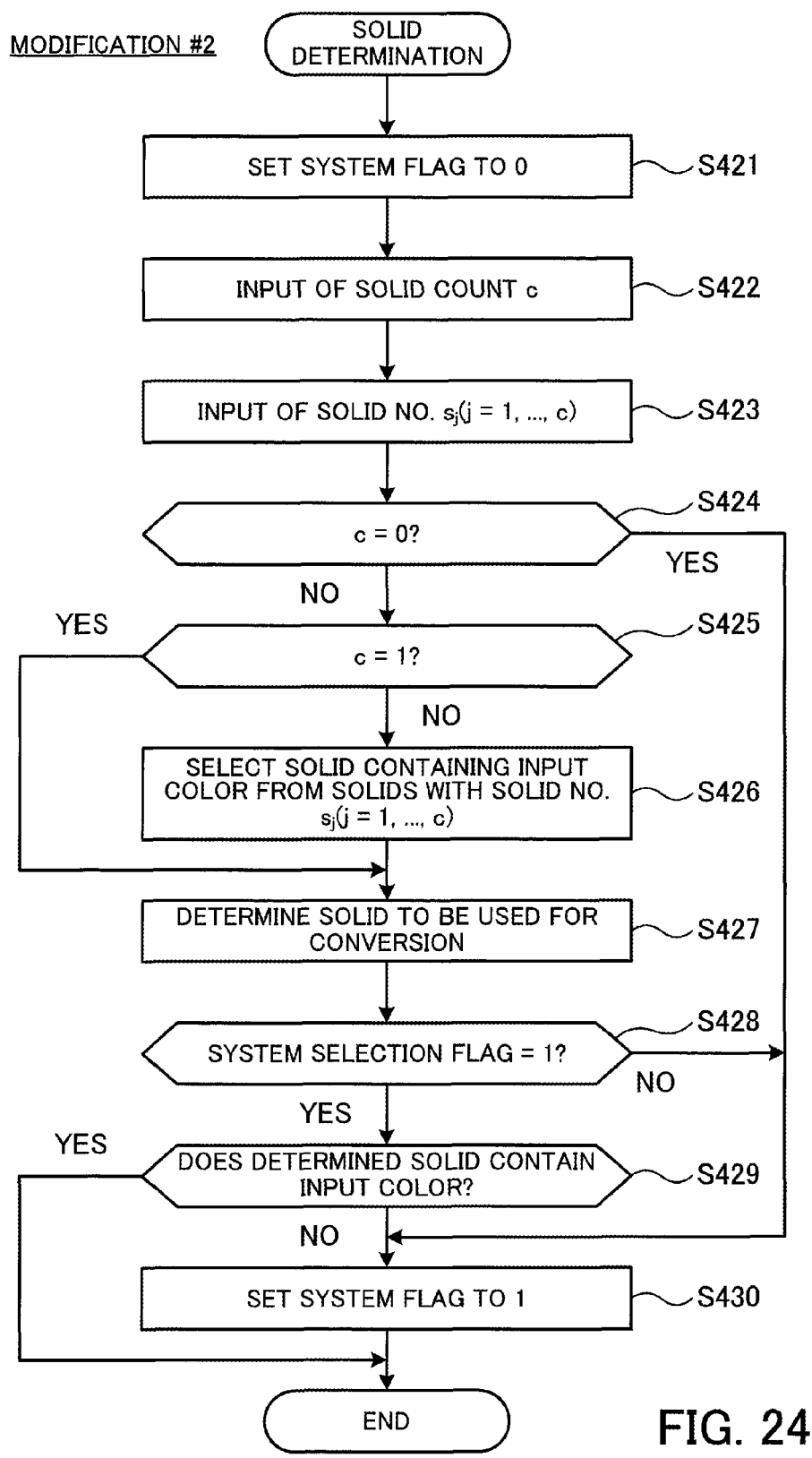
FIG. 24 is a flowchart illustrating the flow of a solid determination process according to the other modified example (modification #2) of the second embodiment.

The following describes the solid determination process according to the modification #2 with reference to FIG. 24. FIG. 24 is a flowchart illustrating the flow of the solid determination process according to the other modified example (modification #2) of the second embodiment. The process illustrated in FIG. 24 is performed by the solid determination unit 142.

As illustrated in FIG. 24, the solid determination unit 142 sets the system flag to 0 (S421). Further, the solid determination unit 142 receives an input of a solid count c representing the number of candidate solids (S422). Further, the solid determination unit 142 receives a solid number $s_j$ (j=1, ..., c) identifying each candidate solid (S423). Note that when c is 0, the solid number $s_j$ (j=1, ..., c) is not input.

Then, the solid determination unit 142 determines whether c is 0 (S424). If c is 0, the process proceeds to step S430. On the other hand, if c is not 0, the process proceeds to step S425. When the process proceeds to step S425, the solid determination unit 142 determines whether c is 1 (S425). If c is 1, the solid determination unit 142 selects the solid with the solid number $s_1$, and the process proceeds to step S427. On the other hand, if c is not 1, the process proceeds to step S426.

When the process proceeds to step S426, the solid determination unit 142 selects a solid containing the input color from solids with solid numbers $s_j$ (j=1, ..., c) (S426). When the operation of step S426 completes, the process proceeds to step S427. When the process proceeds to step S427, the solid determination unit 142 determines the selected solid as a solid to be used for conversion of the input color (S427).

Then, the solid determination unit 142 determines whether the system selection flag corresponding to the solid determined in step S427 is 1 (S428). If the system selection flag corresponding to the solid determined in step S427 is 1, the process proceeds to step S429. On the other hand, if the system selection flag corresponding to the solid determined in step S427 is 0, the process proceeds to step S430.

When the process proceeds to step S429, the solid determination unit 142 determines whether the solid determined in step S427 contains the input color (S429). If the solid determined in step S427 contains the input color, a series of operations illustrated in FIG. 24 ends. On the other hand, if the solid determined in step S427 does not contain the input color, the process proceeds to step S430.

When the process proceeds to step S430, the solid determination unit 142 sets the system flag to 1 (S430). The non-map-using system is selected when the system flag is 1, and a color correction method using maps is selected when the system flag is 0. When the operation of step S430 completes, a series of operations illustrated in FIG. 24 ends.

The above is a description of the solid determination process according to the modification #2.

The above is a description of the modification #2.

(2-5) Appendix (Example of Non-Map-Using System)

An example of the above-mentioned non-map-using system will now be described with reference to FIGS. 25 through 30. Note that color correction processing according to the non-map-using system is performed by the conversion unit 143.

Figure 25:
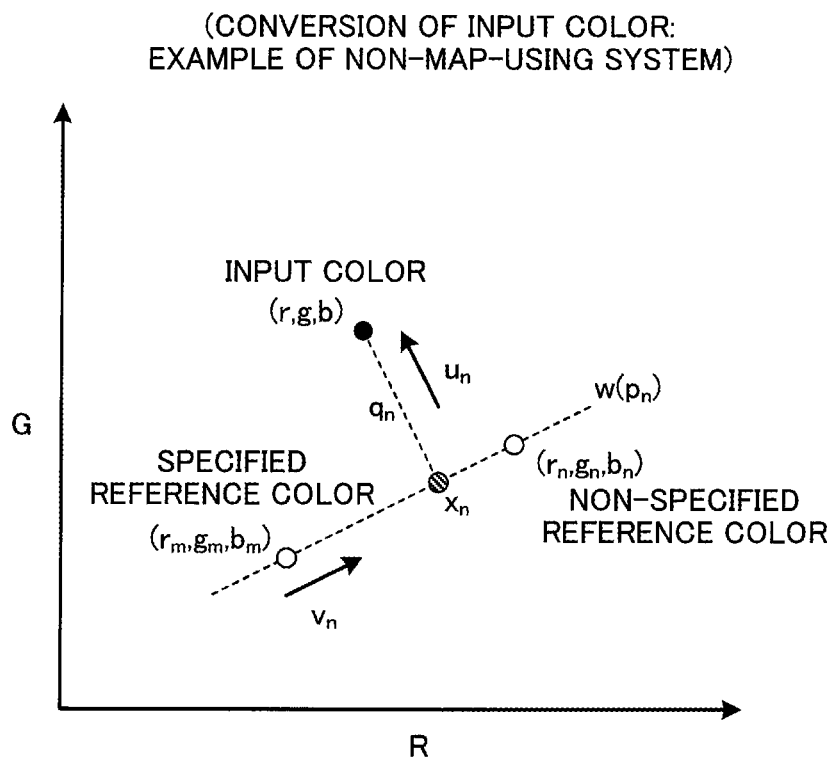
FIG. 25 illustrates an example of a non-map-using system applicable to the modified examples (modifications #1 and #2) of the second embodiment.

In the following description, as illustrated in FIG. 25, the coordinates of the input color are represented by (r, g, b), and the coordinates of N reference colors are represented by $\{(r_n, g_n, b_n), n=1, \ldots, N\}$. FIG. 25 illustrates an example of the non-map-using system applicable to the modified examples (modifications #1 and #2) of the second embodiment.

Further, a reference color located closest to the input color in the color space is referred to as a "specified reference color" (or a "reference color of class 1"), and the coordinates of the specified reference color are represented by $(r_m, g_m, b_m)$. Further, a reference color other than the specified reference color is referred to as a "non-specified reference color" (or a "reference color of class 2"), and the coordinates of the non-specified reference color are represented by $(r_n, g_n, b_n)$ (n≠m). A process according to the non-map-using system will be described below.

(General Flow of Process)

Figure 26:
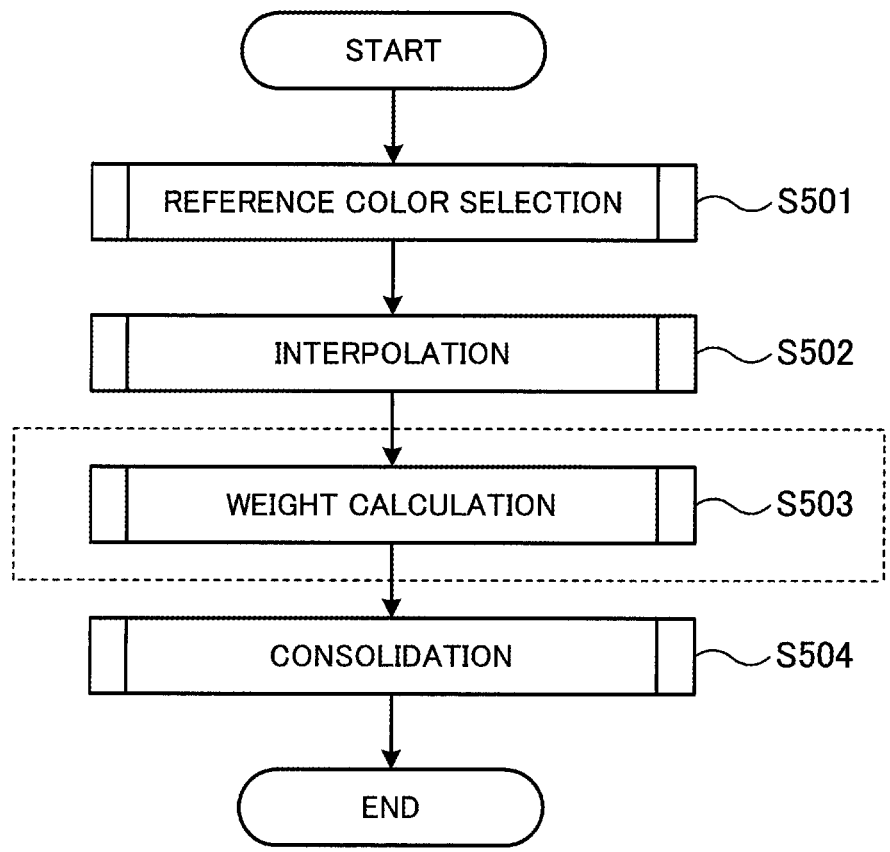
FIG. 26 is a first diagram illustrating the flow of a process according to the non-map-using system applicable to the modified examples (modifications #1 and #2) of the second embodiment.

The general flow of the process according to the non-map-using system will be described with reference to FIG. 26. FIG. 26 is a first diagram illustrating the flow of the process according to the non-map-using system applicable to the modified examples (modifications #1 and #2) of the second embodiment. The process illustrated in FIG. 26 is performed by the conversion unit 143.

As illustrated in FIG. 26, the conversion unit 143 classifies the reference colors into a specified reference color and non-specified reference colors, and selects one of the non-specified reference colors (S501). Then, the conversion unit 143 generates conversion information to be used for color correction of the input color, by interpolation based on the non-specified reference color selected in step S501 and the specified reference color (S502). Then, the conversion unit 143 calculates a weight to the non-specified reference color (S503). Note that in the case where the weight is not used in the subsequent operation, the operation of step S503 may be omitted.

The conversion unit 143 repeats the operations of steps S501 through S503 for all the non-specified reference colors. By repeating these operations, N−1 pieces of conversion information to be used for color conversion of the input color are obtained. The conversion unit 143 consolidates the N−1 pieces of conversion information, and performs color correction of the input color based on the consolidated conversion information (S504). When the operation of step S504 completes, a series of operations illustrated in FIG. 26 ends.

(Reference Color Selection)

Figure 27:
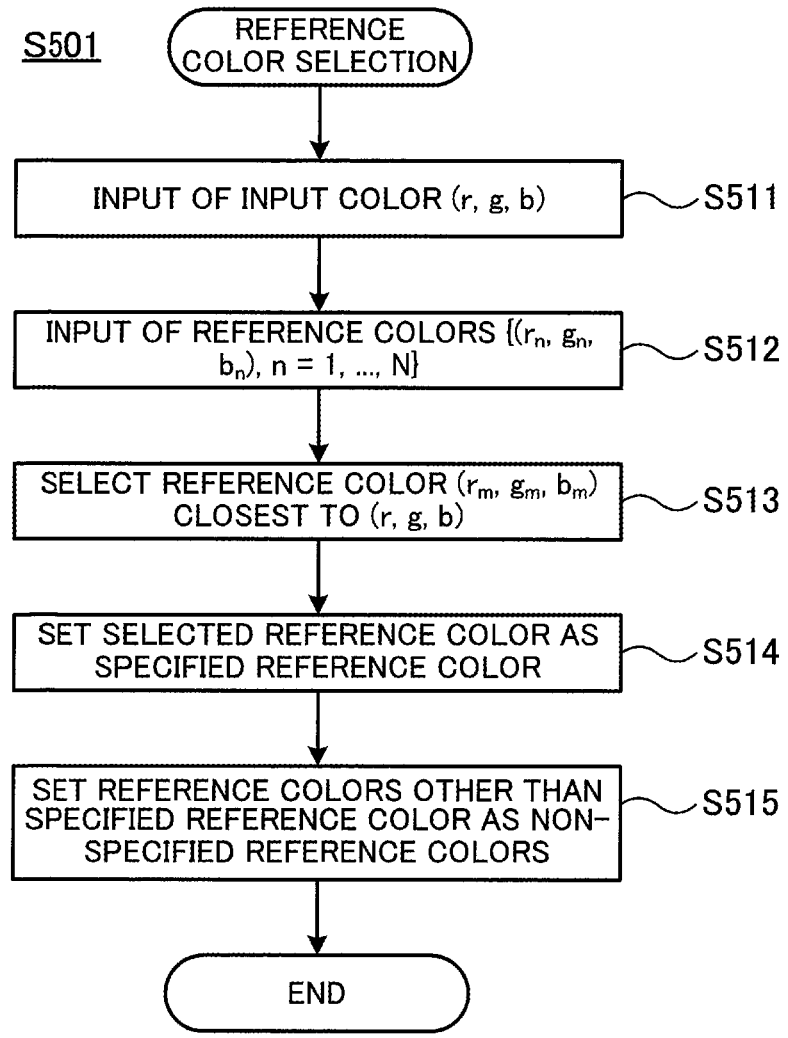
FIG. 27 is a second diagram illustrating the flow of the process according to the non-map-using system applicable to the modified examples (modifications #1 and #2) of the second embodiment.

The process of step S501 will now be further described with reference to FIG. 27. FIG. 27 is a second diagram illustrating the flow of the process according to the non-map-using system applicable to the modified examples (modifications #1 and #2) of the second embodiment.

As illustrated in FIG. 27, the conversion unit 143 receives an input of an input color (r, g, b) (S511). Further, the conversion unit 143 receives an input of reference colors $\{(r_n, g_n, b_n), n=1, \ldots, N\}$ (S512). Then, the conversion unit 143 selects a reference color $(r_m, g_m, b_m)$ closest to the input color (r, g, b) (S513).

Then, the conversion unit 143 sets the reference color selected in step S513 as a specified reference color (S514). Then, the conversion unit 143 sets reference colors other than the specified reference color as non-specified reference colors (S515). When the operation of step S515 completes, a series of operations illustrated in FIG. 27 ends.

Note that the conversion unit 143 may limit the non-specified reference colors to be used for the subsequent operations. For example, the conversion unit 143 may set a reference color whose distance to the input color is less than a predetermined threshold $Th_1$ as a non-specified reference color. In this case, in the operation of step S515, the conversion unit 143 selects a reference color that satisfies the condition given by expression (10) below, and sets the reference color as a non-specified reference color. Note that | . . . | is a norm representing the size of a vector.

$$|(r_n - r_m, g_n - g_m, b_n - b_m)| < Th_1 \quad (10)$$

The above is a description of the process of step S501.

(Interpolation)

Figure 28:
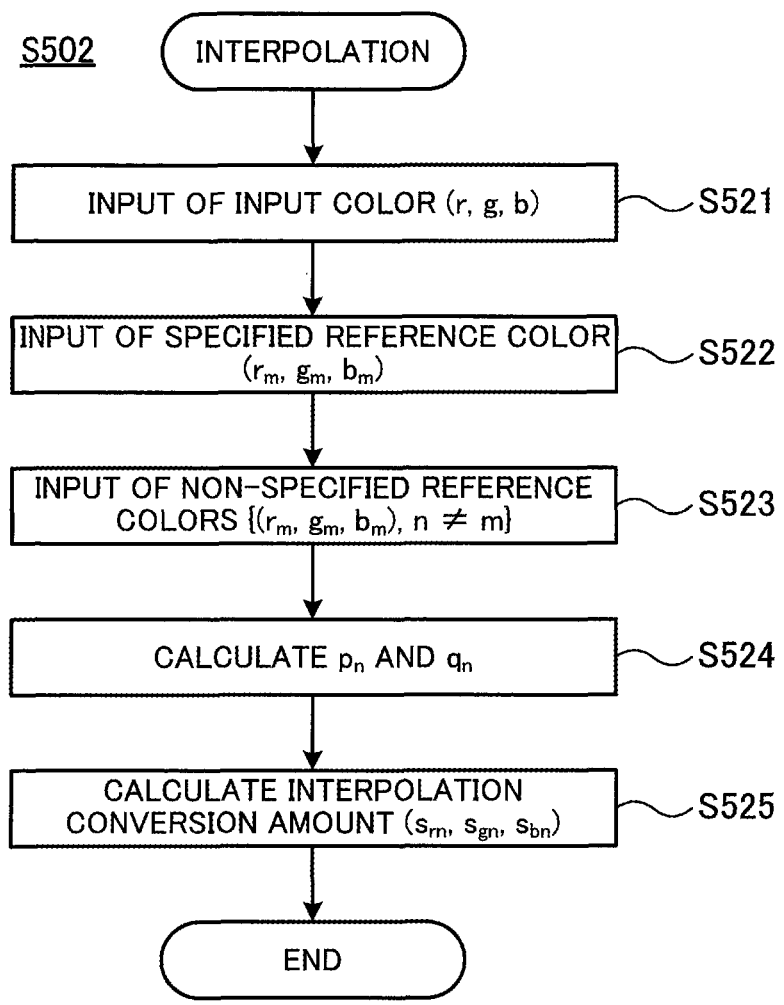
FIG. 28 is a third diagram illustrating the flow of the process according to the non-map-using system applicable to the modified examples (modifications #1 and #2) of the second embodiment.

The process of step S502 will now be further described with reference to FIG. 28. FIG. 28 is a third diagram illustrating the flow of the process according to the non-map-using system applicable to the modified examples (modifications #1 and #2) of the second embodiment.

As illustrated in FIG. 28, the conversion unit 143 receives an input of an input color (r, g, b) (S521). Further, the conversion unit 143 receives an input of a specified reference color ($r_m$, $g_m$, $b_m$) (S522). Further, the conversion unit 143 receives an input of non-specified reference colors $\{(r_n, g_n, b_n), n \neq m\}$ (S523).

Then, the conversion unit 143 calculates parameters $p_n$ and $q_n$ that are used for calculating an interpolation conversion amount to be used for interpolation of the input color (S524). Then, the conversion unit 143 calculates an interpolation conversion amount ($s_{rn}$, $s_{gn}$, $s_{bn}$), using the parameters $p_n$ and $q_n$ calculated in step S524 (S525). When the operation of step S525 completes, a series of operations illustrated in FIG. 28 ends. The operations of steps S524 and S525 will be further described below. In the following description, FIG. 25 will be referred to as needed.

When calculating the interpolation conversion amount, the conversion unit 143 calculates a line segment connecting a non-specified reference color and a specified reference color in the color space, and calculates the interpolation conversion amount using a point ($x_n$) on the line segment closest to the input color. The point $x_n$ closest to the input color is obtained by performing an orthographic projection of the input color onto the line segment. That is, in geometric terms, the point where a perpendicular line from the input color to the line segment intersects the line segment is the above-described point $x_n$ (see FIG. 25).

A point on a line segment connecting the non-specified reference color ($r_n$, $g_n$, $b_n$) and the specified reference color ($r_m$, $g_m$, $b_m$) is represented by $w(p_n)$. Then, $w(p_n)$ is given by expression (11) below, where $p_n$ is a parameter. Further, $v_n$ in expression (11) below is defined by expression (12) below.

$$w(p_n) = \begin{bmatrix} r_s \\ g_s \\ b_s \end{bmatrix} + p_n \cdot v_n, \quad (11)$$

$$v_n = \begin{bmatrix} r_{1s} - r_{0s} & r_{2s} - r_{0s} & r_{3s} - r_{0s} \\ g_{1s} - g_{0s} & g_{2s} - g_{0s} & g_{3s} - g_{0s} \\ b_{1s} - b_{0s} & b_{2s} - b_{0s} & b_{3s} - b_{0s} \end{bmatrix} \begin{bmatrix} k_1 \\ k_2 \\ k_3 \end{bmatrix} + \begin{bmatrix} r_{0s} \\ g_{0s} \\ b_{0s} \end{bmatrix}.$$

$$v_n = \frac{1}{l_n} \begin{bmatrix} r_n - r_m \\ g_n - g_m \\ b_n - b_m \end{bmatrix} \quad (12)$$

Here, $v_n$ defined by the above expression (12) is a unit vector indicating the direction from the specified reference color ($r_m$, $g_m$, $b_m$) to the non-specified reference color ($r_n$, $g_n$, $b_n$). Further, $l_n$ is defined by expression (13) below, and represents the distance between the specified reference color ($r_m$, $g_m$, $b_m$) and the non-specified reference color ($r_n$, $g_n$, $b_n$). Note that if $0 \leq p_n \leq l_n$, then the point $x_n$ obtained by projecting the input color onto the above-described line is located on the line segment connecting the specified reference color ($r_m$, $g_m$, $b_m$) and the non-specified reference color ($r_n$, $g_n$, $b_n$).

The coordinates of the point $x_n$ are given by expression (14) below, where $u_n$ is a unit vector from the point $x_n$ to the input color. The vector $u_n$ and the parameter $q_n$ in expression (14) below are given by expressions (15) through (19), where superscript T denotes the transpose of a vector, and the parameter $q_n$ is the distance from the input color to the point $x_n$. The processing up to this point corresponds to the operation of step S524.

$$l_n = \sqrt{(r_n - r_m)^2 + (g_n - g_m)^2 + (b_n - b_m)^2} \quad (13)$$

$$(r_m, g_m, b_m) + q_n \cdot u_n \quad (14)$$

$$(r - r_m, g - g_m, b - b_m)^T = p_n \cdot v_n + q_n \cdot u_n \quad (15)$$

$$p_n = (r - r_m, g - g_m, b - b_m) \cdot v_n \quad (16)$$

$$u_n = \frac{1}{y_n}\{(r_n - r_m, g_n - g_m, b_n - b_m)^T - p_n \cdot v_n\} \quad (17)$$

$$y_n = |(r - r_m, g - g_m, b - b_m)^T - p_n \cdot v_n| \quad (18)$$

$$q_n = (r - r_m, g - g_m, b - b_m) \cdot u_n \quad (19)$$

The following describes interpolation processing of the point $x_n$. Here, conversion of the specified reference color ($r_m$, $g_m$, $b_m$) is given by expression (20) below, and conversion of the non-specified reference color ($r_n$, $g_n$, $b_n$) is given by expression (21) below. In this case, conversion at the point $x_n$ is given by expression (22) below using liner interpolation. The conversion unit 143 calculates conversion ($s_{rn}$, $s_{gn}$, $s_{bn}$) as the interpolation conversion amount in the operation of step S525. The conversion unit 143 calculates the interpolation conversion amount for all the non-specified reference colors in the same manner.

$$(t_{rm}, t_{gm}, t_{bm}) = (r_{ms} - r_m, g_{ms} - g_m, b_{ms} - b_m) \quad (20)$$

$$(t_{rn}, t_{gn}, t_{bn}) = (r_{ns} - r_n, g_{ns} - g_n, b_{ns} - b_n) \quad (21)$$

$$(s_{rn}, s_{gn}, s_{bn}) = p_n \cdot (t_{rn}, t_{gn}, t_{bn}) + (1 - p_n) \cdot (t_{rm}, t_{gm}, t_{bm}) \quad (22)$$

The above is a description of the process of step S502.

(Weight Calculation)

Figure 29:
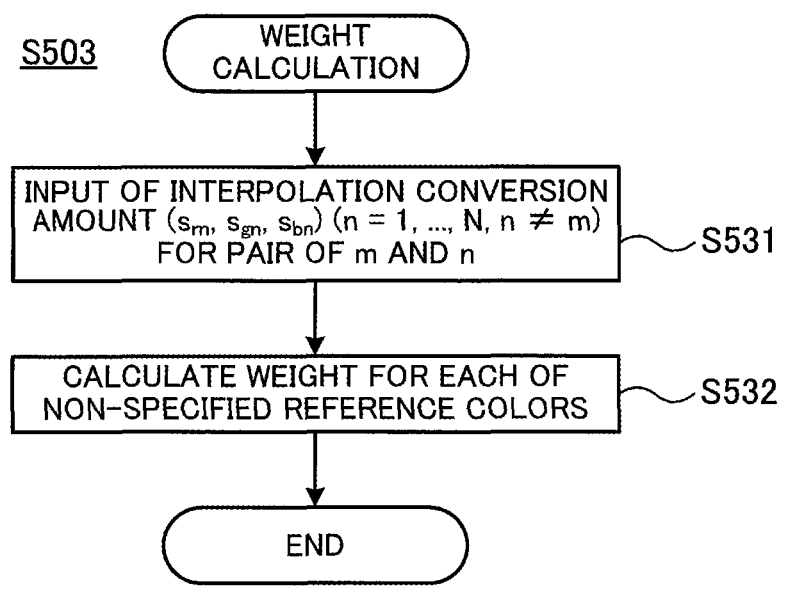
FIG. 29 is a fourth diagram illustrating the flow of the process according to the non-map-using system applicable to the modified examples (modifications #1 and #2) of the second embodiment.

The process of step S503 will now be further described with reference to FIG. 29. FIG. 29 is a fourth diagram illustrating the flow of the process according to the non-map-using system applicable to the modified examples (modifications #1 and #2) of the second embodiment.

As illustrated in FIG. 29, the conversion unit 143 receives an input of the interpolation conversion amount ($s_{rn}$, $s_{gn}$, $s_{bn}$) for a pair of the specified reference color ($r_m$, $g_m$, $b_m$) and the non-specified reference color ($r_n$, $g_n$, $b_n$) (a pair of m and n) (S531). Here, n=1, . . . , N (n≠m). Then, the conversion unit 143 calculates a weight, for each of the non-specified reference colors (S532). When the operation of step S532 completes, a series of operations illustrated in FIG. 29 ends. The operation of step S532 will be further described with reference to three examples. Note that the weight to the non-specified reference color ($r_n$, $g_n$, $b_n$) is represented by $w_n$.

First Example

Weight Calculated Taking Interpolation into Account

The first example relates to a method that calculates the weight $w_n$ which restricts such that only the interpolation conversion amount in the case where the point $x_n$ is located on the segment connecting the specified reference color $(r_m, g_m, b_m)$ and the non-specified reference color $(r_n, g_n, b_n)$ is used for color correction of the input color. In the case where this method is applied, the weight $w_n$ is given by expression (23) below. In this case, the conversion unit 143 calculates the weight $w_n$ based on expression (23) below. Note that the conversion unit 143 calculates the parameter z used in the operation of step S504 based on expression (24) below.

$$\begin{cases} w_n = 1 & 0 \le p_n \le 1 \\ w_n = 0 & p_n > 1, p_n < 0 \end{cases} \quad (23)$$

$$z = \sum_{n=1, n \ne m}^{N} w_n \quad (24)$$

Second Example

Weight Calculated Taking Length of Perpendicular Line into Account

The second example relates to a method that calculates the weight $w_n$ in accordance with the magnitude of the parameter $q_n$ representing the length of the perpendicular line from the input color to the point $x_n$. In the case where this method is applied, the weight $w_n$ is given by expression (25) below. In this case, the conversion unit 143 calculates the weight $w_n$ based on expression (25) below. Further, the conversion unit 143 calculates the parameter z used in the operation of step S504 based on the above expression (24).

$$w_n = \frac{1}{q_n^2} \quad (25)$$

Third Example

Weight Calculated Taking Distance Between Reference Colors into Account

The third example relates to a method that calculates the weight $w_n$ in accordance with the distance $l_n$ between the specified reference color $(r_m, g_m, b_m)$ and the non-specified reference color $(r_n, g_n, b_n)$. It is assumed that the greater the distance $l_n$ is, the less the interpolation of the input color is affected by the non-specified reference color $(r_n, g_n, b_n)$. Accordingly, the conversion unit 143 calculates the weight $w_n$ based on expression (26) below. Further, the conversion unit 143 calculates the parameter z used in the operation of step S504 based on the above expression (24).

$$\begin{cases} w_n = 1 & l_n > Th_l \\ w_n = 0 & l_n \le Th_l \end{cases} \quad (26)$$

The above is a description of the process of step S503.

(Consolidation)

Figure 30:
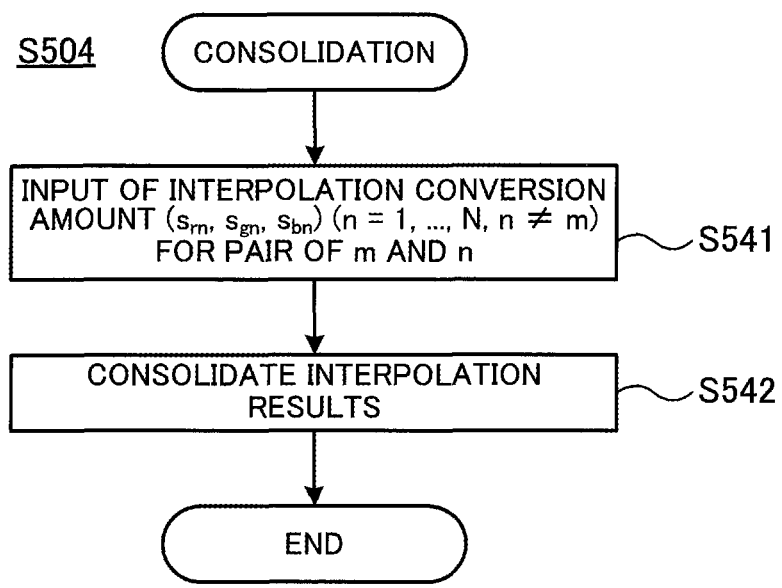
FIG. 30 is a fifth diagram illustrating the flow of the process according to the non-map-using system applicable to the modified examples (modifications #1 and #2) of the second embodiment.

The process of step S504 will now be further described with reference to FIG. 30. FIG. 30 is a fifth diagram illustrating the flow of the process according to the non-map-using system applicable to the modified examples (modifications #1 and #2) of the second embodiment.

As illustrated in FIG. 30, the conversion unit 143 receives an input of the interpolation conversion amount $(s_{rn}, s_{gn}, s_{bn})$ for a pair of the specified reference color $(r_m, g_m, b_m)$ and the non-specified reference color $(r_n, g_n, b_n)$ (a pair of m and n) (S541). Here, n=1, ..., N (n≠m). Then, the conversion unit 143 consolidates the interpolation results (interpolation conversion amounts calculated for the respective non-specified reference colors) (S542). When the operation of step S542 completes, a series of operations illustrated in FIG. 30 ends. The operation of step S542 will be further described below.

For example, in the case of using the weight $w_n$ (n=1, ..., N, n≠m) described as the first example and the parameter z, the conversion unit 143 consolidates the interpolation conversion amounts based on expression (27) below, and calculates conversion $(s_r, s_g, s_b)$ for the input color. Similarly, in the case of using the weight $w_n$ (n=1, ..., N, n≠m) described as the second and third examples and the parameter z, the conversion unit 143 consolidates the interpolation conversion amounts based on expression (27) below.

$$(s_r, s_g, s_b) = \frac{1}{z} \sum_{\substack{n=1 \\ n \ne m}}^{N} w_n (s_{rn}, s_{gn}, s_{bn}) \quad (27)$$

(Taking into Account Plural Types of Weights)

Two or more of the weights $w_n$ (n=1, ..., N, n≠m) described in the first through third examples may be used in combination. For example, the conversion unit 143 consolidates the interpolation conversion amounts based on expression (28) below, where $w_n^{(1)}$ is the weight $w_n$ according to the first example, $w_n^{(2)}$ is the weight $w_n$ according to the second example, and $w_n^{(3)}$ is the weight $w_n$ according to the third example. Note that the parameter z is given by expression (29) below. When $w_n^{(j)}$ is 1 for all the n-values, expression (28) below is an expression that does not take into account the weight $w_n$ according to a j-th example.

$$(s_r, s_g, s_b) = \frac{1}{z} \sum_{\substack{n=1 \\ n \ne m}}^{N} w_n^{(1)} w_n^{(2)} w_n^{(3)} (s_{rn}, s_{gn}, s_{bn}) \quad (28)$$

$$z = \sum_{n=1, n \ne m}^{N} (w_n^{(1)} w_n^{(2)} w_n^{(3)}) \quad (29)$$

(Omitting Calculation of Weight)

In the case of not taking into account the weight $w_n$ and omitting the process of step S503, the conversion unit 143 consolidates the interpolation conversion amounts based on expression (30) below. That is, the conversion unit 143 calculates conversion $(s_r, s_g, s_b)$ for the input color by obtaining the average of N−1 interpolation conversion amounts.

$$(s_r, s_g, s_b) = \frac{1}{N-1} \sum_{\substack{n=1 \\ n \ne m}}^{N} (s_{rn}, s_{gn}, s_{bn}) \quad (30)$$

The above is a description of the process of step S504.

The above is a description of the example of the non-map-using system.

The above is a description of the second embodiment. By applying the technique of the second embodiment, it is possible to perform high-accuracy color correction based on volume interpolation using maps at high speed. Further, by applying modifications described above, high-accuracy color correction using maps is realized in the case where the input color is contained in a solid whose vertices are defined by reference colors. Further, even in the case where the input color is not contained in any solid, color correction of the input color is realized directly using reference colors.

The techniques described above are applicable to color correction processing performed in, for example, printers, scanners, cameras, or displays used for personal computers and smart phones.

According to the present invention, it is possible to perform interpolation processing of an input color based on reference colors that are arbitrarily set in a color space.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
   a memory configured to store a table including information on regions respectively occupied by a plurality of solids whose vertices are defined by a plurality of reference colors that are set in a color space, each of the solids having an evaluation value less than a setting value, the evaluation value decreasing as a length of edges thereof decreases, the solids being arranged such that faces thereof do not cross each other; and
   a processor configured to perform a procedure including:
      specifying a solid containing an input color with use of the table, and performing interpolation processing of the input color with use of the reference colors corresponding to the vertices of the specified solid, wherein
      each of the solids is a triangular pyramid;
      the evaluation value decreases as the length of each of the edges connecting four vertices of the triangular pyramid decreases.

2. The information processing apparatus according to claim 1, wherein:
   the table is a look-up table that associates positional information for identifying a region in the color space and identification information for identifying each of the solids.

3. The information processing apparatus according to claim 1, wherein:
   the table includes maps, one for each coordinate axis of the color space, each of the maps representing a correspondence relationship between each value on the coordinate axis and the solids; and
   the processor specifies the solid containing the input color with use of the maps.

4. The information processing apparatus according to claim 1, wherein:
   the memory stores conversion information for converting a position in the color space identified from each of the reference colors contained in an image into a position in the color space that is set for the reference color; and
   the processor calculates a conversion amount for the input color, based on the conversion information.

5. The information processing apparatus according to claim 1, wherein when the input color is not contained in any of the plurality of solids, the interpolation processing of the input color is performed based on the reference color located near the input color in the color space.

6. The information processing apparatus according to claim 1, wherein when the evaluation value of the solid containing the input color is greater than a set threshold, the interpolation processing of the input color is performed based on the reference color located near the input color in the color space.

7. A non-transitory computer-readable storage medium storing a computer program that causes a computer to perform a procedure comprising:
   reading, by a processor, from a memory, a table including information on regions respectively occupied by a plurality of solids whose vertices are defined by a plurality of reference colors that are set in a color space, each of the solids having an evaluation value less than a setting value, the evaluation value decreasing as a length of edges thereof decreases, the solids being arranged such that faces thereof do not cross each other; and
   specifying, by the processor, a solid containing an input color with use of the table, and performing interpolation processing of the input color with use of the reference colors corresponding to the vertices of the specified solid, wherein
   each of the solids is a triangular pyramid;
   the evaluation value decreases as the length of each of the edges connecting four vertices of the triangular pyramid decreases.

* * * * *